(12) United States Patent
Jang

(10) Patent No.: US 10,911,685 B2
(45) Date of Patent: Feb. 2, 2021

(54) MONITORING APPARATUS AND SYSTEM WHICH DETECTS EVENTS OCCURRED IN A REGION OF INTEREST AND COUNTS A NUMBER OF OCCURRED EVENTS

(71) Applicant: HANWHA TECHWIN CO., LTD., Seongnam-si (KR)

(72) Inventor: Se Mi Jang, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 79 days.

(21) Appl. No.: 16/257,826

(22) Filed: Jan. 25, 2019

(65) Prior Publication Data

US 2019/0174070 A1    Jun. 6, 2019

Related U.S. Application Data

(63) Continuation of application No. PCT/KR2016/009008, filed on Aug. 17, 2016.

(30) Foreign Application Priority Data

Jul. 25, 2016    (KR) .................. 10-2016-0094189

(51) Int. Cl.
*H04N 5/232* (2006.01)
*H04N 7/18* (2006.01)
(Continued)

(52) U.S. Cl.
CPC ......... *H04N 5/232945* (2018.08); *G08B 5/22* (2013.01); *G08B 13/196* (2013.01);
(Continued)

(58) Field of Classification Search
CPC ....... H04N 5/232945; H04N 5/232933; H04N 5/23206; H04N 7/185; H04N 7/188;
(Continued)

(56) References Cited

U.S. PATENT DOCUMENTS 8,553,084 B2 * 10/2013 Vallone .............. G06K 9/00771
348/143
2012/0176496 A1 * 7/2012 Carbonell .............. H04N 7/181
348/143
(Continued)

FOREIGN PATENT DOCUMENTS

KR    10-2011-0023633    3/2011
KR    10-2014-0066560    6/2014
(Continued)

OTHER PUBLICATIONS

International Search Report dated Feb. 10, 2017, in International Application No. PCT/KR2016/009008 (with English Translation).

*Primary Examiner* — Luong T Nguyen
(74) *Attorney, Agent, or Firm* — H.C. Park & Associates, PLC

(57) ABSTRACT

A monitoring device includes: a communication unit configured to receive an image from a camera; a screen unit configured to display the image; and a control unit configured to control the operation of the communication unit and the screen unit, wherein the screen unit may be configured to mark event detection areas on the image, wherein, in response to an event occurring in an event detection area, the control unit may be configured to count a number of the events that occurred, wherein the screen unit may be configured to numerically display the counted number of the events in the event detection area, and wherein the event detection area may correspond to a target monitoring area.

20 Claims, 24 Drawing Sheets

(51) Int. Cl.
 *G08B 13/196* (2006.01)
 *G08B 5/22* (2006.01)
 G06F 3/0482 (2013.01)
 G06F 3/0486 (2013.01)
 G06F 3/0488 (2013.01)

(52) U.S. Cl.
 CPC ... *H04N 5/23206* (2013.01); *H04N 5/232933* (2018.08); *H04N 7/185* (2013.01); *H04N 7/188* (2013.01); *G06F 3/0482* (2013.01); *G06F 3/0486* (2013.01); *G06F 3/04883* (2013.01)

(58) Field of Classification Search
 CPC .. G06F 3/04883; G06F 3/0482; G06F 3/0486; G08B 5/22; G08B 13/196
 See application file for complete search history.

(56) References Cited

U.S. PATENT DOCUMENTS

| | | | |
|---|---|---|---|
| 2013/0100306 A1* | 4/2013 | Bekiares | H04N 5/23296 348/211.99 |
| 2013/0293718 A1* | 11/2013 | M | G08B 13/19671 348/152 |
| 2015/0142587 A1* | 5/2015 | Salgar | G06Q 20/206 705/18 |
| 2016/0034762 A1 | 2/2016 | Chang et al. | |

FOREIGN PATENT DOCUMENTS

| | | |
|---|---|---|
| KR | 10-2015-0012115 | 2/2015 |
| KR | 10-2016-0074811 | 6/2016 |

* cited by examiner

MONITORING APPARATUS AND SYSTEM WHICH DETECTS EVENTS OCCURRED IN A REGION OF INTEREST AND COUNTS A NUMBER OF OCCURRED EVENTS

CROSS REFERENCE TO RELATED APPLICATION

This application is a Bypass Continuation of International Patent Application No. PCT/KR2016/009008, filed on Aug. 17, 2016, and claims priority to and the benefit of Korean Patent Application No. 10-2016-0094189, filed on Jul. 25, 2016, which is hereby incorporated by reference for all purposes as if fully set forth herein.

BACKGROUND

Field

Exemplary implementations of the invention relate generally to a monitoring device and system, and more specifically, to a monitoring device and system which can search for events that occurred only in an area desired by a user to be monitored particularly intensively and enable the user to easily check the number of events that occurred without any special operation.

Discussion of the Background

Generally, surveillance systems are widely used in various places including banks, department stores, and residential areas. These surveillance systems can be used for crime prevention and security purposes, but recently, they are also used to monitor pets or children indoors in real time. The most commonly used surveillance system is a closed circuit television (CCTV) system in which a camera is installed at an appropriate location to capture a desired area, and a user keeps an eye on the desired area by monitoring a video captured by the camera.

Recently, such a CCTV system provides an event search function. The term 'event' refers to various incidents that occur while a camera is capturing a specific area. Examples of the event include a motion event in which a person or an animal moves, a motion and sound event in which a glass falls from a cupboard and breaks, and a heat and light event in which a fire breaks out. CCTVs have recently been connected to various sensors to detect the occurrence of an event using the sensors and also provide an event notification function for notifying a user of the occurrence of an event.

However, there may be an area desired by a user to be particularly monitored. For example, since an intruder may steal valuables from a safe, an area around the safe may be desired to be particularly monitored. Or, if a child is at home alone, he or she can be injured by misuse of kitchen utensils in the kitchen. Thus, the kitchen may be desired to be particularly monitored. However, a camera stores videos of events all together instead of storing videos of events that occurred in some areas separately.

In addition, although there are various types of events such as a motion event and a sound event, the camera stores all types of event videos together without classifying them according to the type of event.

Therefore, if a user extracts search results using the event search function in order to check events that occurred in the past, the amount of content accumulated is too large. Hence, in order to search for events that occurred only in a specific area or events corresponding to a specific type, the user has to check all the event videos one by one, which takes a lot of time and is very cumbersome.

The above information disclosed in this Background section is only for understanding of the background of the inventive concepts, and, therefore, it may contain information that does not constitute prior art.

SUMMARY

Devices constructed according to exemplary implementations of the invention are capable of providing a monitoring device and system which can detect events that occurred only in an area desired by a user to be monitored particularly intensively and enable the user to easily check the number of events that occurred without any special operation.

Additional features of the inventive concepts will be set forth in the description which follows, and in part will be apparent from the description, or may be learned by practice of the inventive concepts.

According to one or more implementations of the invention, a monitoring device includes: a communication unit configured to receive an image from a camera; a screen unit configured to display the image; and a control unit configured to control the operation of the communication unit and the screen unit, wherein the screen unit may be configured to mark event detection areas on the image, wherein, in response to an event occurring in an event detection area, the control unit may be configured to count a number of the events that occurred, wherein the screen unit may be configured to numerically display the counted number of the events in the event detection area, and wherein the event detection area may correspond to a target monitoring area.

In response to the event detection area being selected, the control unit may be configured to count the number of events separately for each type of event occurred in the selected event detection area, and the screen unit is further configured to display an event detail display area numerically displaying the counted number for each type of event.

In response to the event detection area being selected, the control unit may be configured to search for events by type.

The screen unit may be further configured to display a list icon and, in response to the list icon being selected, configured to display a list of names of event detection areas.

The screen unit may be configured to display a setting change icon and a delete icon around the name of each event detection area on the list, wherein setting of a corresponding event detection area may be changed in response to the setting change icon being selected, and wherein a corresponding event detection area may be deleted in response to the delete icon being selected.

The monitoring device may further include an input unit, wherein the communication unit may be further configured to communicate with an external sensor for detecting an event, and wherein the screen unit may be configured to display a window for selecting at least one of event detection using the external sensor and event detection using the image, in response to receiving a first user input for setting the event detection area through the input unit.

In response to a second user input for selecting the event detection using the external sensor being received through the input unit, the control unit may be configured to set the event detection area to detect the occurrence of an event through an event signal from the external sensor.

In response to a third user input for selecting the event detection using the image being received through the input unit, the control unit may be configured to set the event detection area to detect the occurrence of an event through a region of interest (ROI) specified in the image.

The camera may include a pan-tilt camera, and a full-angle-of-view image of the camera is captured before setting the event detection area.

In response to the event detection area not being set, the screen unit may be configured to display a window that is adjusted to accurately set the event detection area.

According to one or more implementations of the invention, a monitoring system including: a camera configured to capture an image; at least one sensor configured to generate an event signal in response to detecting at least one of various types of events; and a monitoring device configured to communicate with the camera and the at least one sensor, the monitoring device including: a communication unit configured to receive the image from the camera and the event signal from the at least one sensor; a screen unit configured to display the image; and a control unit configured to control operation of the communication unit and the screen unit, wherein the monitoring device may be configured to mark one or more target monitoring areas on the image, wherein the control unit may be configured to detect an event related to a target monitoring area based on the event signal, and count a number of events that occurred in the target monitoring area, and wherein the screen unit may be configured to numerically display the counted number of events in the target monitoring area In response to the target monitoring area being selected, the control unit may be configured to count the number of events separately for each type of event occurred in the target monitoring area, and the screen unit is further configured to display an event detail display area numerically displaying the counted number for each type of event.

In response to the target monitoring area being selected, the control unit may be configured to search for events related to the target monitoring area.

The control unit may be configured to search for the events related to the target monitoring area by type of the event.

The screen unit may be further configured to display a list icon and, in response to the list icon being selected, configured to display a list of names of target monitoring areas.

According to one or more implementations of the invention, a monitoring system including: a camera configured to capture an image; and a monitoring device configured to communicate with the camera, the monitoring device including: a communication unit configured to receive the image from the camera; a screen unit configured to display the image; and a control unit configured to control operation of the communication unit and the screen unit, wherein the control unit may be configured to detect the occurrence of an event in a region of interest (ROI) in response to the ROI being defined in the image, and wherein the screen unit may be configured to mark the ROIs on the image, wherein, in response to the occurrence of an event being detected in the ROI, the control unit may be configured to count a number of events that occurred, and wherein the screen unit may be configured to numerically display the counted number of events in the ROI.

In response to the ROI being selected, the control unit may be configured to count the number of events separately for each type of event occurred in the selected ROI, and the screen unit is further configured to display an event detail display area numerically displaying the counted number for each type of event.

In response to the ROI being selected, the control unit may be configured to search for events occurred in the ROI.

The control unit may be configured to search for the events by type.

The screen unit may be further configured to display a list icon and, in response to the list icon being selected, configured to display a list of names of event detection areas.

Additional features of the inventive concepts will be set forth in the description which follows, and in part will be apparent from the description, or may be learned by practice of the inventive concepts.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
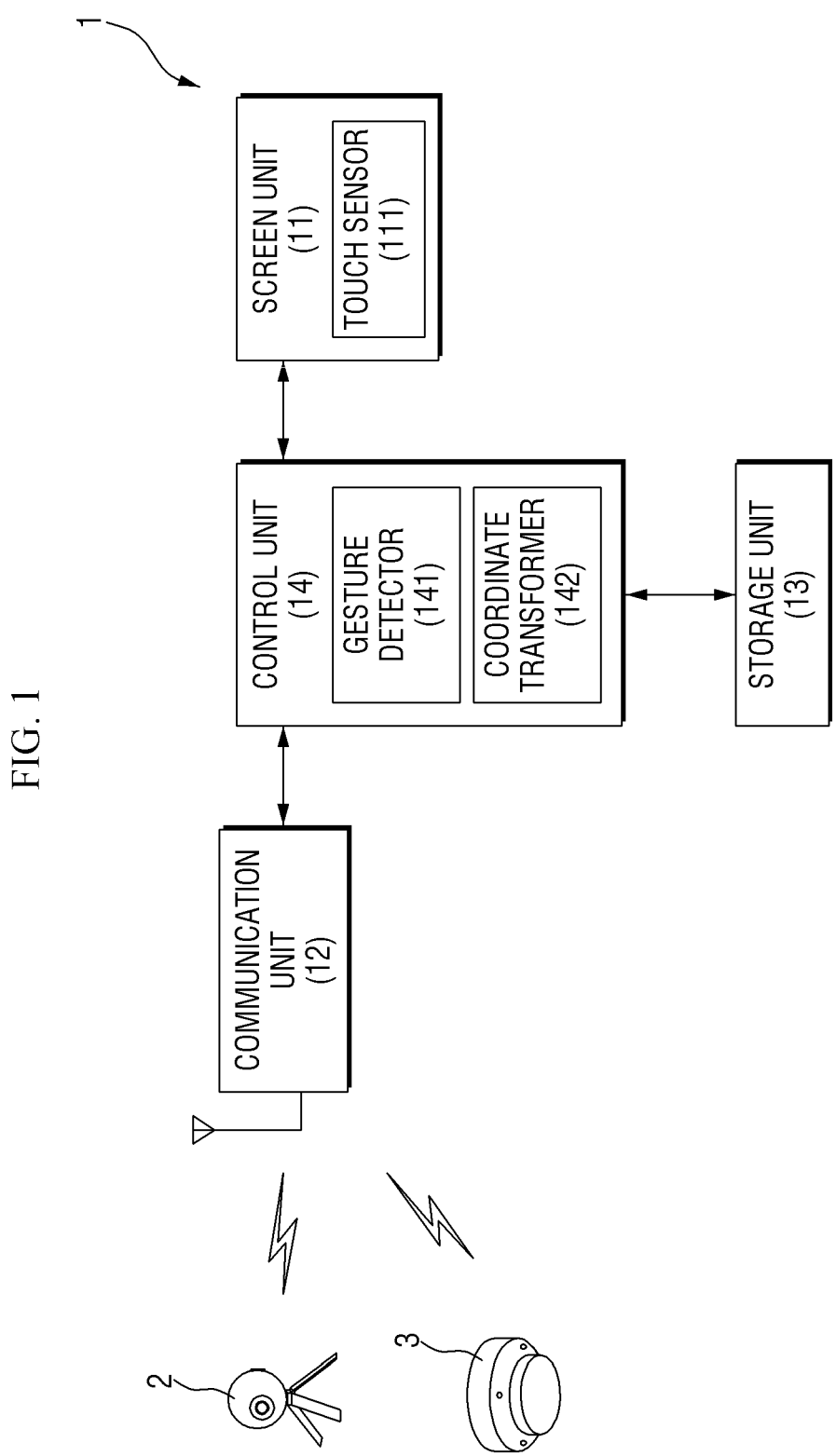
FIG. 1 is a block diagram of a monitoring system according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
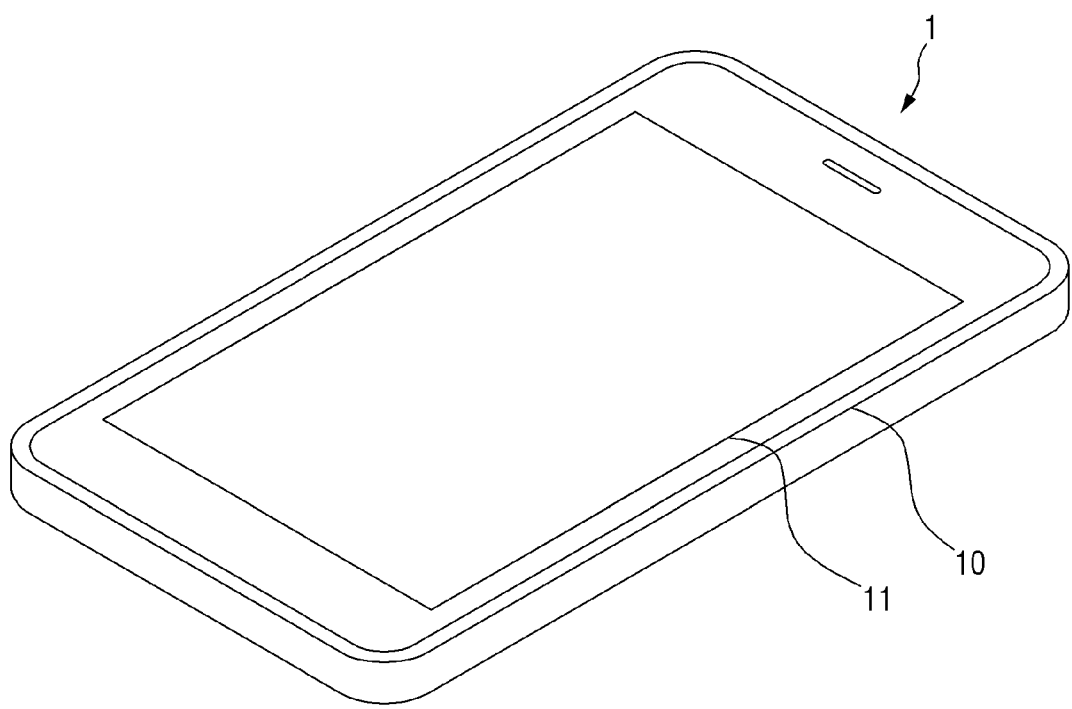
FIG. 2 is a perspective view of a monitoring device 1 of FIG. 1.

FIG. 1 is a block diagram of a monitoring system according to an exemplary embodiment of the present disclosure. FIG. 2 is a perspective view of a monitoring device 1 of FIG. 1.

According to a method using the monitoring system according to the exemplary embodiment of the present disclosure, a camera 2 obtains an image by capturing a specific area. Then, the image obtained by the camera 2 is displayed on a screen unit 11 of the monitoring device 1. In addition, the screen unit 11 of the monitoring device 1 marks an event detection area 117 on the image. In the specific area captured by the camera 2, there may be an area desired by a user to be monitored particularly intensively. The event detection area 117 refers to an area set by the riser in the image at a location corresponding to the target monitoring area. The number of events that occurred in the target monitoring area for a specific time is counted and numerically displayed in the event detection area 117. Therefore, the user can easily check the number of events that occurred in the target monitoring area for the specific time through the event detection area 117 without any special operation.

The monitoring system according to the exemplary embodiment of the present disclosure includes the camera 2 configured to obtain an image by capturing a specific area, a sensor 3 configured to transmit a signal when detecting the occurrence of an event, and the monitoring device 1 configured to receive and displays the image obtained by the camera 2 and receives the signal from the sensor 3. The camera 2 or the sensor 3 and the monitoring device 1 are connected to each other in a wired or wireless manner to transmit and receive image data or signals.

The camera 2 according to the exemplary embodiment of the present disclosure may be a pan-tilt camera capable of panning and tilting. Alternatively, the camera 2 may be a 360-degree camera introduced recently. The 360-degree camera refers to a camera capable of capturing all directions simultaneously using a plurality of fisheye lenses, instead of the camera itself physically panning or tilting. In this case, an image obtained by the 360-degree camera is panned or tilted by software installed in the monitoring device 1. The camera 2 according to the exemplary embodiment of the present disclosure is not limited to the above examples, and various cameras 2 can be used.

The sensor 3 according to the exemplary embodiment of the present disclosure may detect an event. Examples of the sensor 3 include a fire sensor 3 for detecting the outbreak of fire, a smoke sensor 3 for detecting the generation of smoke, and a heat or motion sensor 3 for detecting the appearance of a person or an animal. Furthermore, in recent years, an Internet of Things (IoT) network that enables distributed elements such as objects to exchange information with each other has been developed. The sensor 3 according to the exemplary embodiment of the present disclosure may be a sensor 3 built in an IoT-dedicated module to implement such IoT technology. That is, the sensor 3 is not limited to a particular type, and various types of sensors 3 can be used as long as they can detect any type of event.

The monitoring device 1 according to the exemplary embodiment of the present disclosure can detect the occurrence of an event even if the sensor 3 does not exist. That is, even if the sensor 3 does not exist, when an event occurs in the target monitoring area while the camera 2 is capturing the specific area, the occurrence of the event is detected and analyzed using an image obtained by the camera 2. Here, the user may specify a region of interest (ROI), which is an area where the camera 2 can detect the occurrence of an event. The ROI is a region of interest of the user. If the ROI is specified in the image obtained by the camera 2, when an event occurs in an area corresponding to the ROI in the specific area captured by the camera 2, it is possible to identify whether the event has occurred and the type of the event even without the sensor 3.

According to an exemplary embodiment of the present disclosure, if the sensor 3 is installed in the specific area and the user wants to check an event through the sensor 3, the event detection area 117 may be set such that the sensor 3 is activated. Alternatively, if the sensor 3 is not installed or the user wants to check an event through the ROI described above, the event detection area 117 may be set by specifying the ROI in the specific area. That is, the user may set the event detection area 117 by selecting a method of checking an event in advance. Then, the monitoring system according to the exemplary embodiment of the present disclosure detects and stores the occurrence of an event at the event detection area 117 using the selected method.

According to embodiments of the present disclosure, various methods other than the sensor 3 or the ROI can also be used as long as it is possible to identify whether an event has occurred and the type of the event. In the present specification, cases where the occurrence and type of an event are identified using the sensor 3 and the ROI will be mainly described. However, this is only for ease of description and is not intended to limit the scope of rights.

The monitoring device 1 according to the exemplary embodiment of the present disclosure receives and displays an image obtained by the camera 2. In addition, the monitoring device 1 detects the occurrence of an event by receiving a signal from the sensor 3. The monitoring device 1 may be a device that provides a touch function, such as a smartphone, a tablet PC, a laptop, etc. However, the monitoring device 1 is not limited to the above examples and may also be a device that receives a user command through a mouse or the like. The monitoring device 1 will hereinafter be mainly described as a device that provides the touch function. However, this is only for ease of description and is not intended to limit the scope of rights.

The screen unit 11 displays an image transmitted from the camera 2. The image may be a real-time image (live view) captured and obtained in real time by the camera 2 or may be an image (play back) loaded and displayed after being previously captured and stored in a storage unit 13. The screen unit 11 marks the event detection area 117 on the image. The number of events that occurred in the target monitoring area for a specific time is counted and numerically displayed in the event detection area 117. If the monitoring device 1 provides the touch function, the screen unit 11 may include a touch sensor 111. In this case, the user may directly input a touch signal through the screen unit 11. The touch sensor 111 may be integrally mounted with the screen unit 11. The touch sensor 111 detects coordinates of an area where a touch occurred, the number and intensity of touches, etc. by sensing a touch on the screen unit 11 and transmits the detection result to a control unit 14. Depending on the way the touch sensor 111 senses a touch, various types such as capacitive, resistive, ultrasonic, and infrared types can be used. Even if the monitoring device 1 provides the touch function, a touch pad may be provided as an input unit if the screen unit 11 does not include the touch sensor 111. A touch may be performed using a finger. However, the present disclosure is not limited to this case, and a touch may also be performed using a stylus pen equipped with a tip through which a microcurrent can flow. If the monitoring device 1 does not provide the touch function, an input unit (such as a mouse) for inputting a user command may be provided.

A communication unit 12 transmits and receives signals and data to and from the camera 2 and the sensor 3 in a wired or wireless manner. For example, the communication unit 12 modulates and frequency up-converts signals and data received from the control unit 14 and transmits the modulated and frequency up-converted signals and data or frequency down-converts and demodulates signals and data received from the camera 2 and the sensor 3 and provides the frequency down-converted and demodulated signals and data to the control unit 14. Through this process, the communication unit 12 may receive image data from the camera 2 or signals from the sensor 3 and transmit data or signals generated by the control unit 14 to the camera 2 or the sensor 3.

The storage unit 13 stores programs for processing and controlling operations of the monitoring device 1, various data generated during the execution of each program, image data received from the camera 2, and signals received from the sensor 3. The storage unit 13 may be embedded in the monitoring device 1. However, in the case of a network camera system, a separate device such as a network video recorder (NVR) may be provided.

The control unit 14 controls the overall operation of the monitoring device 1. For example, the control unit 14 performs processing and controlling for signal and data communication between the communication unit 12 and the camera 2 or the sensor 3 and performs image processing such as decoding and rendering when an image is received through the communication unit 12. In addition, the control unit 14 controls the screen unit 11 to mark the event detection area 117 and, if the event detection area 117 is set, searches for events that occurred at the event detection area 117 for a specific time. The control unit 14 stores an image in the storage unit 13 and controls the storage unit 13 to load a stored image. The control unit 14 may be a central processing unit (CPU), a microcontroller unit (MCU), or a digital signal processor (DSP). However, the control unit 14 is not limited to these examples, and various logical operation processors can be used.

The control unit 14 includes a gesture detector and a coordinate transformer. The gesture detector detects a touch gesture from the touch sensor 111. The touch gesture includes all touch operations generated from the touch sensor 111. If the monitoring device 1 does not provide the touch function, a user command input through an input unit such as a mouse is detected. The gesture detector manages the touch sensor 111 and includes an application program interface (API) that allows the user to easily use a touch gesture on an application. The API is an interface that controls functions provided by an operating system or programming language so that the functions can be used by an application program. Through the API, the gesture detector receives a user command for executing a camera control application and receives a user command for controlling an activated application.

The coordinate transformer receives coordinates, at which a user command was input, from the gesture detector and generates a change value of a video and image based on the coordinates. When the user performs a touch at one point, coordinates of the point are extracted. When the user performs a drag on a displayed image, coordinates on the drag path are extracted at regular periods or intervals. The coordinate transformer may identify the point at which the touch was performed through the extracted coordinates and determine a user command that the user intends to input. Alternatively, the coordinate transformer may identify the direction and distance in which the drag is performed through the extracted coordinates and transform the extracted coordinates into values used to pan an image. By performing the user command or panning the image using the values and displaying the result on the screen unit 11, it possible to inform the user about the result of the user's command.

Figure 3:
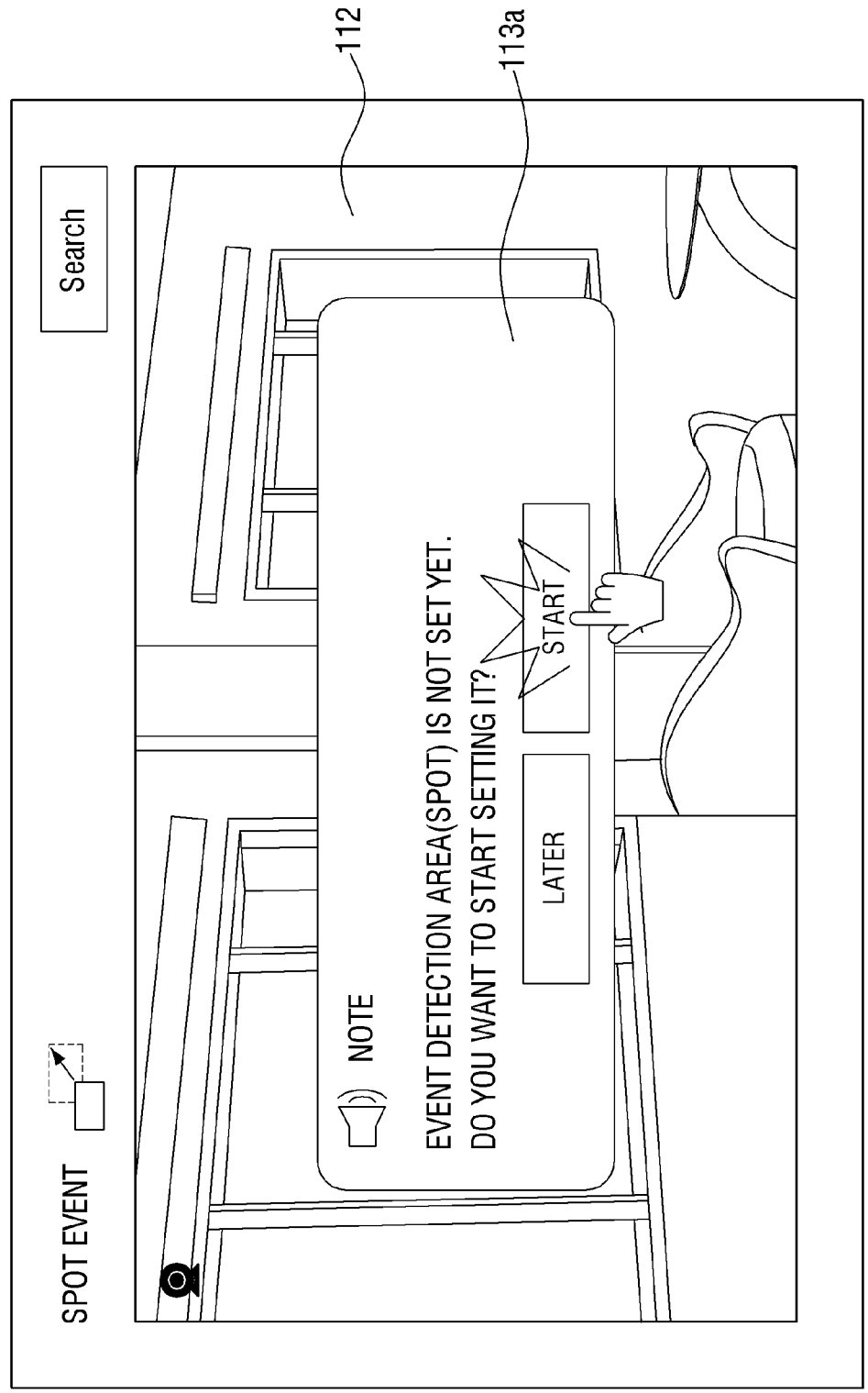
FIG. 3 illustrates a displayed guide window for starting the setting of an event detection area according to an exemplary embodiment of the present disclosure.
Figure 4:
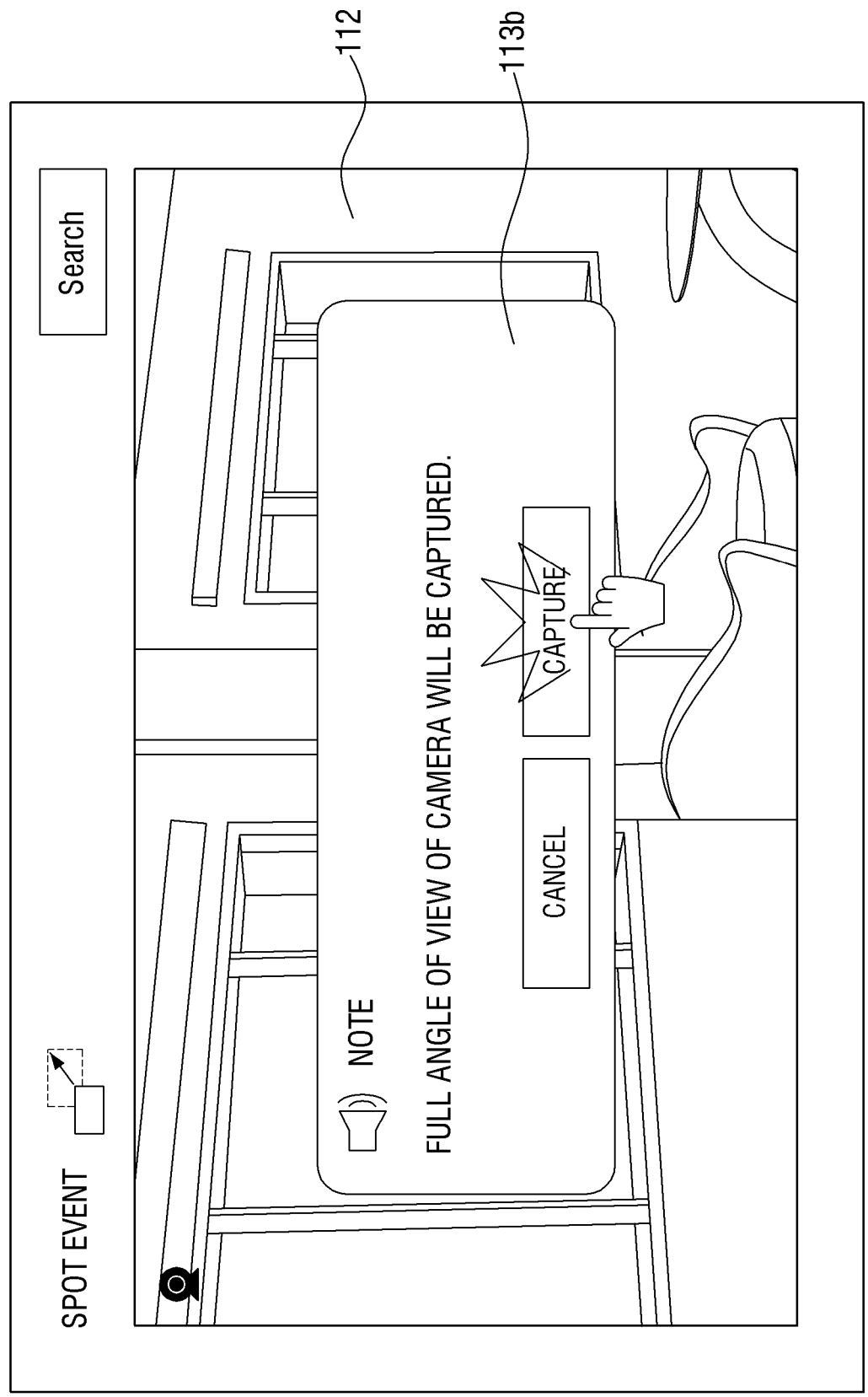
FIG. 4 illustrates a displayed guide window for capturing the full angle of view of a camera according to an exemplary embodiment of the present disclosure.

FIG. 3 illustrates a displayed guide window 113a for starting the setting of the event detection area (spot) 117 according to an exemplary embodiment of the present disclosure. FIG. 4 illustrates a displayed guide window 113b for capturing the full angle of view of the camera 2 according to an exemplary embodiment of the present disclosure.

Figure 18:
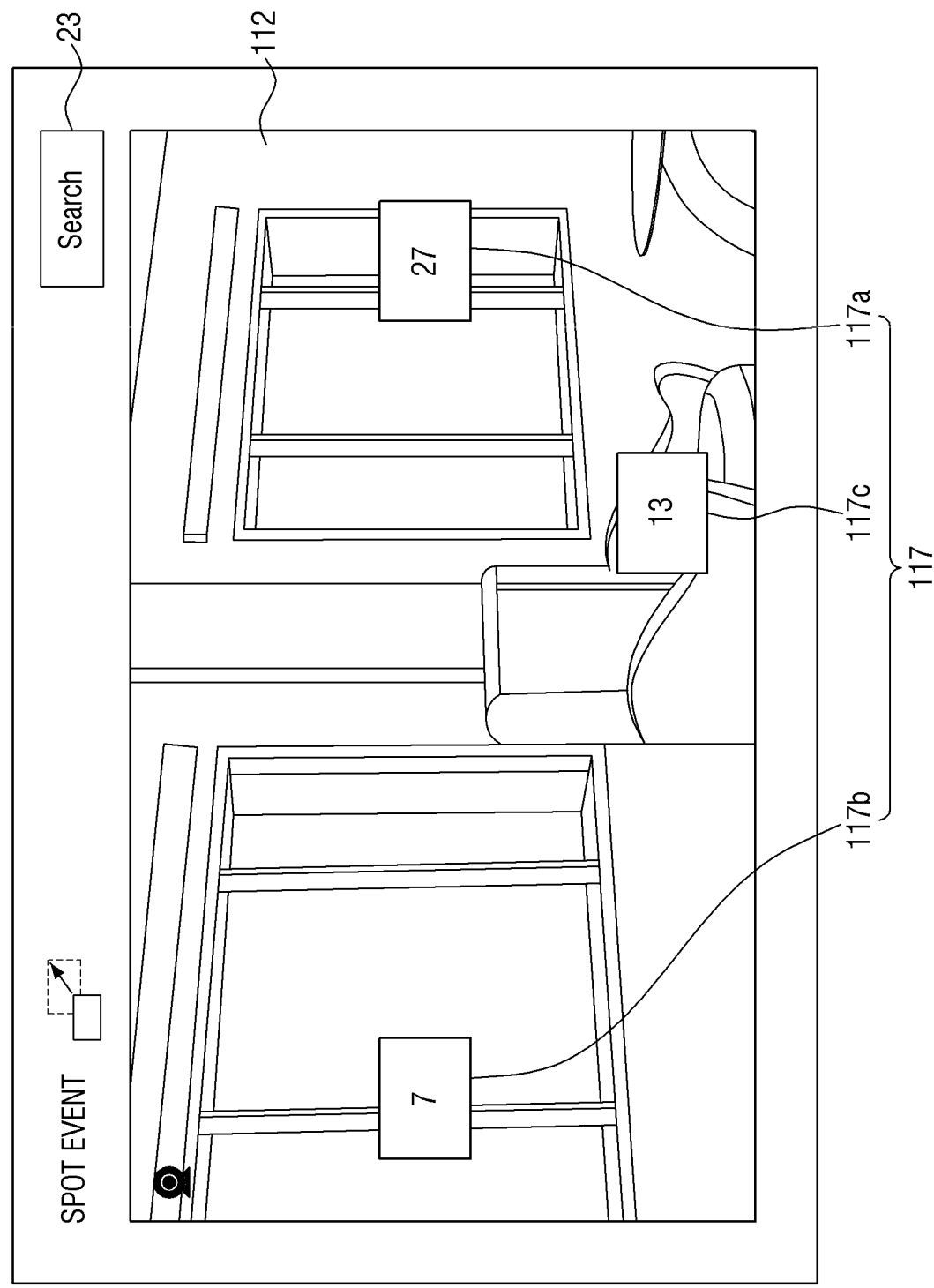
FIG. 18 illustrates a state where the setting of event detection areas has been completed according to an exemplary embodiment of the present disclosure.

When the monitoring device 1 according to the exemplary embodiment of the present disclosure is executed, a menu for selecting Live View, Playback, Event, and Option is displayed. Here, if Event is selected, a main image 112 is displayed on the screen unit 11. The main image 112 may be a live view captured and obtained in real time by the camera 2. However, the main image 112 is not limited to the live view and may also be an image loaded and displayed after being previously captured. If the event detection area 117 has been set, it is marked on the main image 112 immediately. Event detection areas 117 marked on the main image 112 are illustrated in FIG. 18, which will be described in detail later. However, if the event detection area 117 has not been set, the guide window 113a for setting the event detection area 117 is displayed as illustrated in FIG. 3.

The guide window 113a asks the user whether to start the setting of the event detection area 117 and displays two selection buttons that can be selected by the user. When the user selects a 'Later' button, the event detection area 117 is not marked, and only the main image 112 is displayed on the screen unit 11. However, when the user selects a 'Start' button, the guide window 113b for capturing the full angle of view of the camera 2 is displayed as illustrated in FIG. 4.

In order to set the event detection area 117, the full angle of view of the camera 2 must be captured first. This is because the user can accurately specify a point to be set as the event detection area 117 through a full-angle-of-view image 112a that can be captured by the camera 2. When the user selects a 'Capture' button in the guide window 113b, the camera 2 captures the full angle of view that can be captured.

Figure 5:
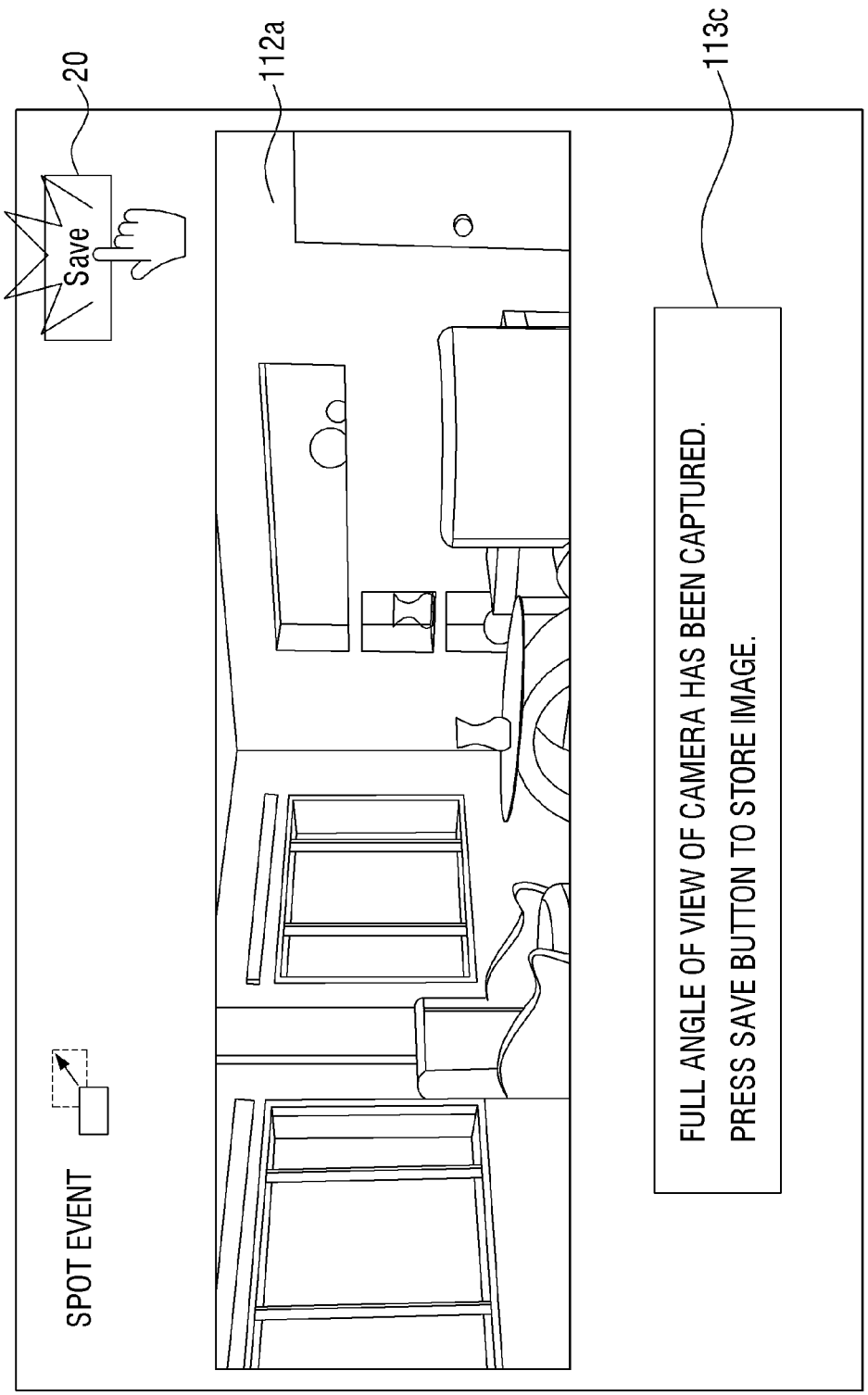
FIG. 5 illustrates a state where the capturing of the full angle of view of the camera in FIG. 4 has been completed.

FIG. 5 illustrates a state where the capturing of the full angle of view of the camera 2 in FIG. 4 has been completed.

When the camera 2 according to the exemplary embodiment of the present disclosure completes capturing the full angle of view, the full-angle-of-view image 112a is displayed on the screen unit 11 as illustrated in FIG. 5. The full-angle-of-view image 112a may be in the form of a panorama view representing, in an image, the entire range that can be captured by the camera 2. The panorama view is an image obtained by taking photographs longer in one direction than a general image in order to capture a lot of scenes in one image. If the camera 2 is a pan-tilt camera, it is not easy to capture a panorama view in real time. Therefore, the panorama view may be obtained by combining, side by side, a plurality of images obtained by the camera 2 through panning or tilting. The panorama view thus obtained is a still picture, not a live view. In addition, if the angle of panning or tilting of the pan-tilt camera 2 is limited, the length of the panorama view decreases as the limited angle is smaller and increases as the limited angle is greater.

When the camera 2 finishes the capturing, a guide window 113c for storing the full-angle-of-view image 112a obtained by the camera 2 is displayed. When the user selects a Save button 20 as illustrated in FIG. 5, the full-angle-of-view image 112a is stored, and the user can set the event detection area 117 on the full-angle-of-view image 112a.

If the camera 2 is a 360-degree camera, it can capture a panorama view in real time because its angle of view is very wide. Therefore, the main image 112 displayed on the screen unit 11 may be an image captured as a panorama view, and the panorama view may be a live view which is a real-time image. In this case, since the main image 112 itself is an image captured as a panorama view and is a real-time image, the operation of capturing the full angle of view using the camera 2 and the operation of storing the full-angle-of-view image 112a captured by the camera 2 are not necessary. Therefore, the windows shown in FIGS. 4 and 5 do not need to be displayed on the screen unit 11. In addition, since the full angle of view of the camera 2 is 360 degrees, the same image obtained by capturing the same area may be displayed at both right and left ends of the panorama view.

Figure 6:
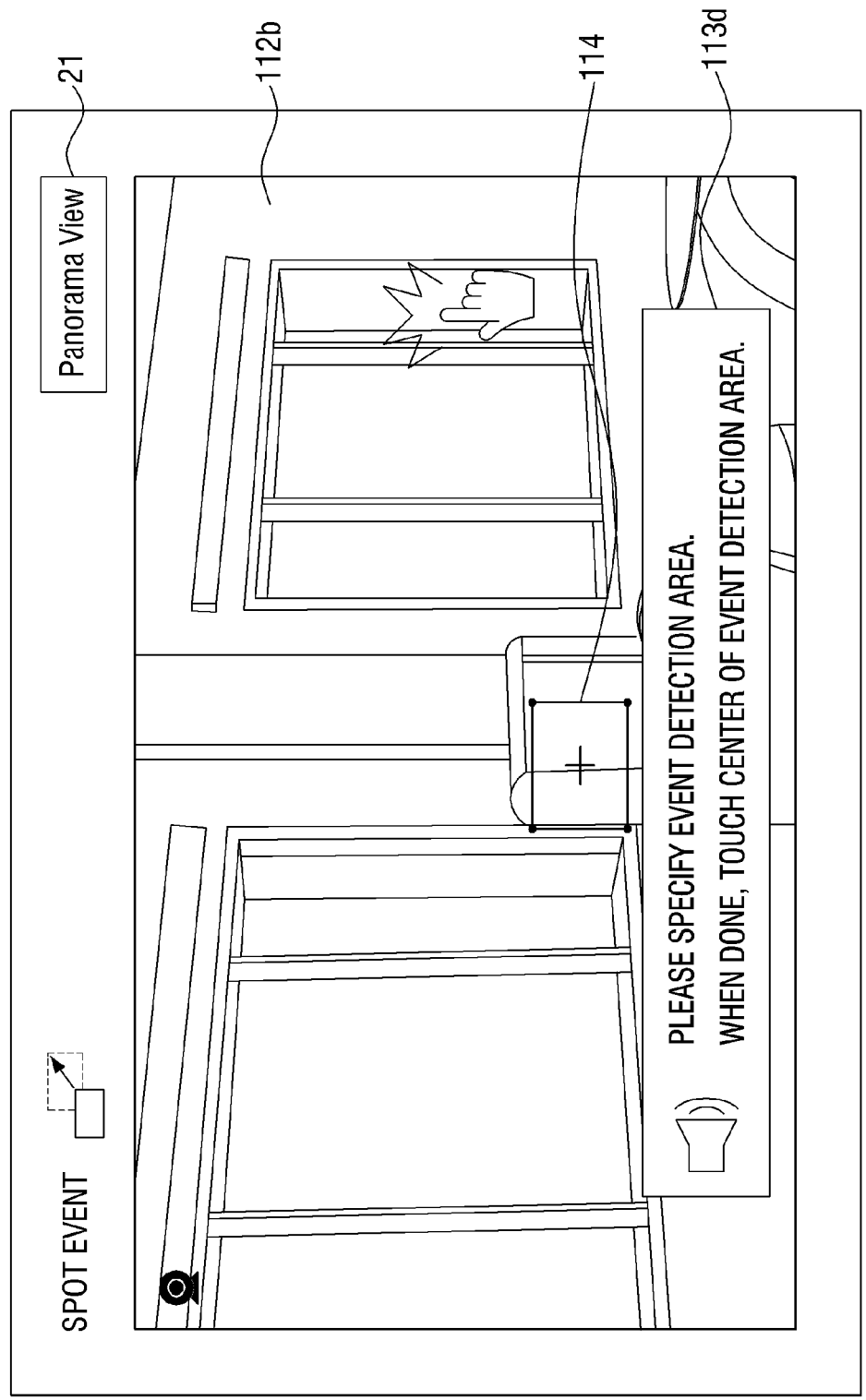
FIG. 6 illustrates an operation of selecting one point in a partial image of a full-angle-of-view image to set the event detection area according to an exemplary embodiment of the present disclosure.
Figure 7:
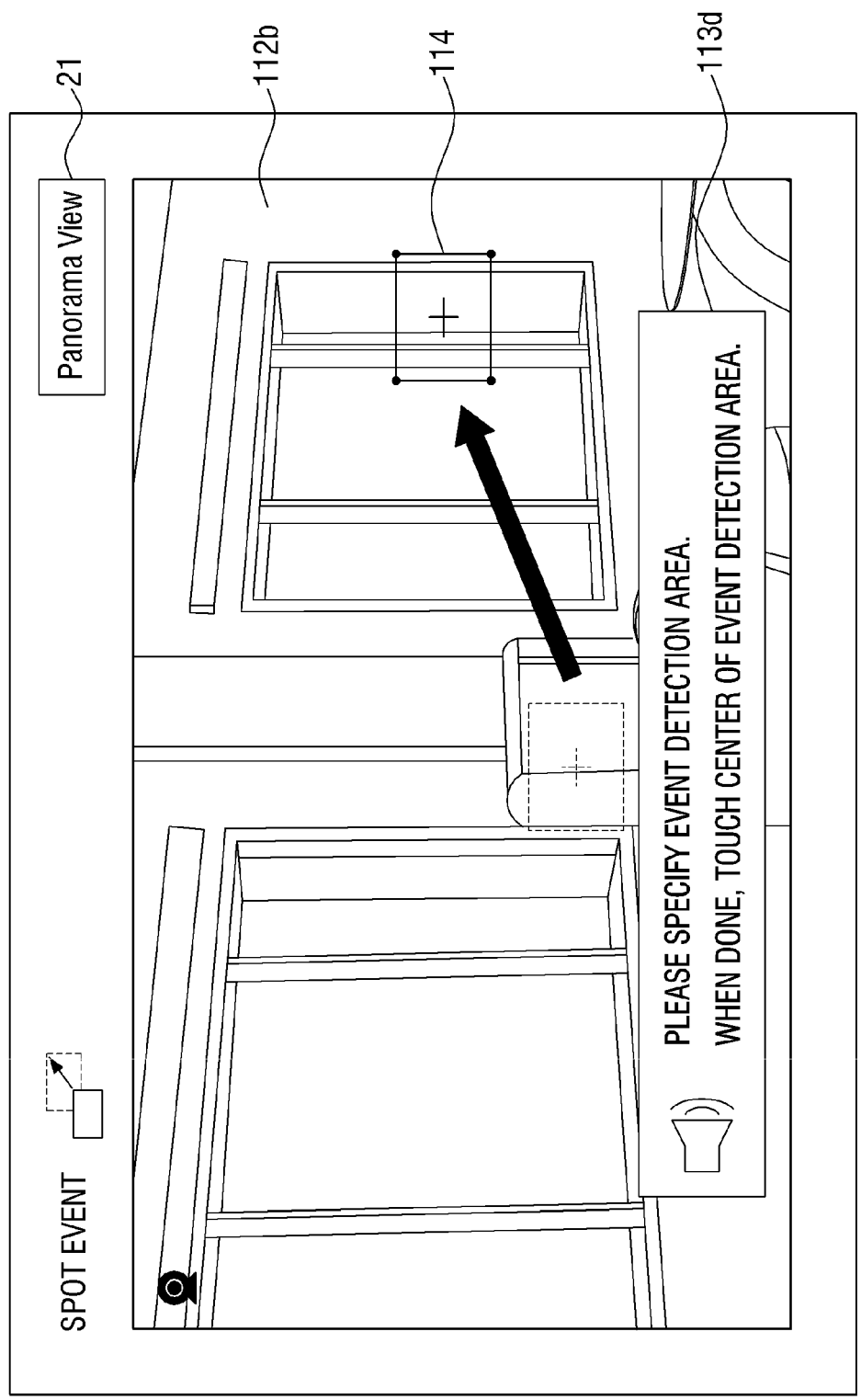
FIG. 7 illustrates a window displayed at the point by the selection of the point in FIG. 6.

FIG. 6 illustrates an operation of selecting one point in a partial image 112b of the full-angle-of-view image to set the event detection area 117 according to an exemplary embodiment of the present disclosure. FIG. 7 illustrates a window 114 displayed at the point by the selection of the point in FIG. 6.

If the full-angle-of-view image 112a is stored, the full-angle-of-view image 112b is displayed on the screen unit 11 so that the user can set the event detection area 117. The user may set the event detection area 117 by selecting one point in the full-angle-of-view image 112b. Here, since the full-angle-view image 112a is a panorama view, it is formed long in one direction. If the whole of the full-angle-of-view image 112a is displayed on the screen unit 11, even if the user intends to select a point, the user may actually select a point somewhat different from the point. This is because the full-angle-of view image 112a formed long in one direction is not fully enlarged and because precise selection is difficult due to the contact area of a finger or the like. Therefore, to enable the user to easily set the event detection area 117, the full-angle-of-view image 112a may be enlarged such that only the partial image 112b is displayed on the screen unit 11.

Tap is one of the touch gestures and refers to briefly touching the screen unit 11 and then releasing the touch immediately. The touch is generally maintained for less than one second. As for taps successively performed within a short time, taps performed twice are called a double tap, and taps performed three times are called a triple tap.

If the user can input a command to the monitoring device 1 through a touch, he or she may select a point by tapping the point as illustrated in FIG. 6. Here, the screen unit 11 displays a guide window 113d for guiding the user to tap a point. When a point is selected, the window 114 is displayed at the point as illustrated in FIG. 7. The window 114 is a temporary layout that can be adjusted by the user to accurately specify an area to be set as the event detection area 117. The window 114 is formed to surround an area to be set by the user as the event detection area 117 and may have a quadrilateral shape. The user can accurately set the event detection area 117 by adjusting the window 114.

The window 114 may be displayed on the screen unit 11 before the user selects a point. In this case, if the user selects a point, the window 114 may move to the point. However, the present disclosure is not limited to this case, and the window 114 may not be displayed on the screen unit 11 before the user selects a point and may be displayed at the point only after the user selects the point. That is, as long as the window 114 can be displayed at a point after the user selects the point, the window 114 can be displayed at various times before the user selects the point, without being limited to a particular time.

If the user can input a command to the monitoring device 1 through an input unit such as a mouse, he or she may select a point by clicking on the point.

As described above, if the camera 2 is a 360-degree camera 2, the main image 112 itself is an image captured as a panorama view. Therefore, the operation of capturing the full angle of view using the camera 2 and the operation of storing the full-angle-of-view image 112a captured by the camera 2 are not necessary. That is, the user can proceed to the operation of selecting a point directly from the operation of starting the setting of the event detection area 117.

Figure 8:
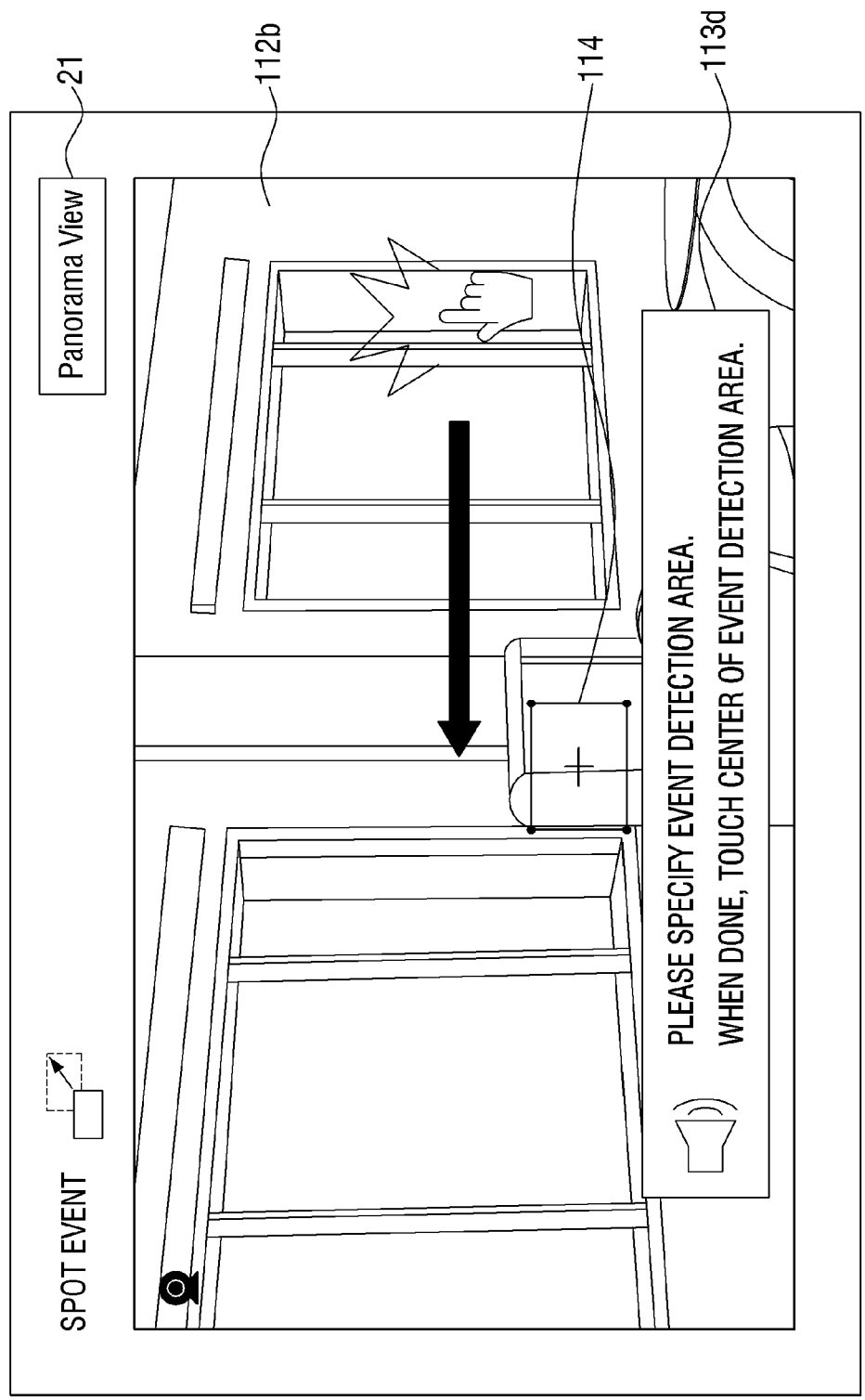
FIG. 8 illustrates an operation of dragging the partial image of the full-angle-of-view image according to an exemplary embodiment of the present disclosure.
Figure 9:
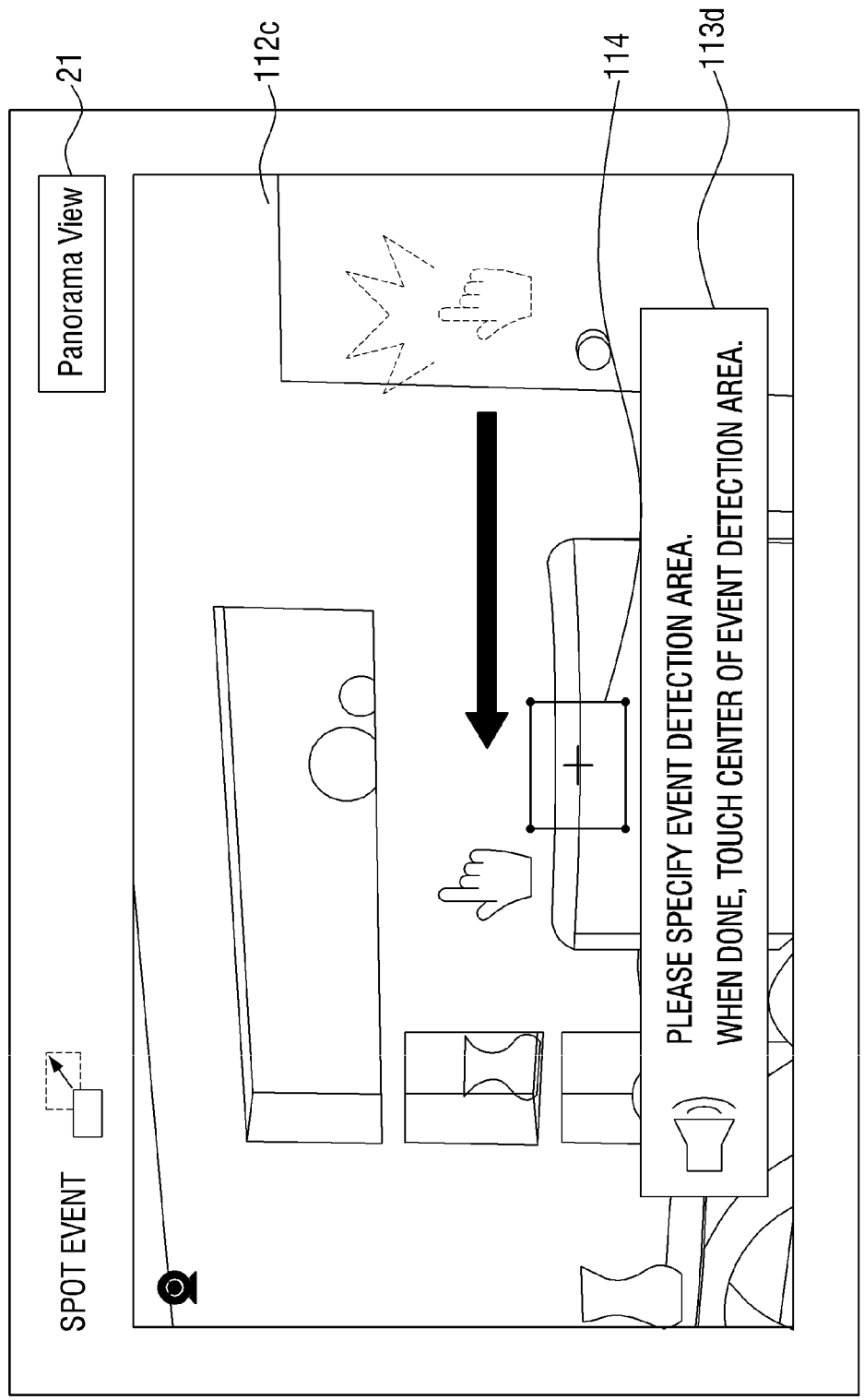
FIG. 9 illustrates the partial image of the full-angle-of-image panned as a result of the operation of FIG. 8.

FIG. 8 illustrates an operation of dragging the partial image 112b of the full-angle-of-view image according to an exemplary embodiment of the present disclosure. FIG. 9 illustrates the partial image 112c of the full-angle-of-image panned as a result of the operation of FIG. 8.

Drag is one of the touch gestures and refers to drawing a specific object from one point to another point in order to move the specific object on the screen.

The partial image 112b of the full-angle-of-view image is displayed on the screen unit 11 of the monitoring device 1. Here, to perform a drag, the user touches the partial image 112b as illustrated in FIG. 8 and draws the partial image 112b from one point to another point. Then, the partial image 112c is displayed as panned or tilted, as illustrated in FIG. 9. Here, the user must keep the touch in order to draw the partial image 112b.

Once the partial image 112c is panned or tilted to display an area desired by the user, the touch is released. If the partial image 112c cannot be panned or tilted to the desired area with only one drag, the above process is repeated.

If the user can input a command to the monitoring device 1 using a mouse, he or she may drag the partial image 112b with the mouse to pan or tilt the partial image 112c.

Figure 10:
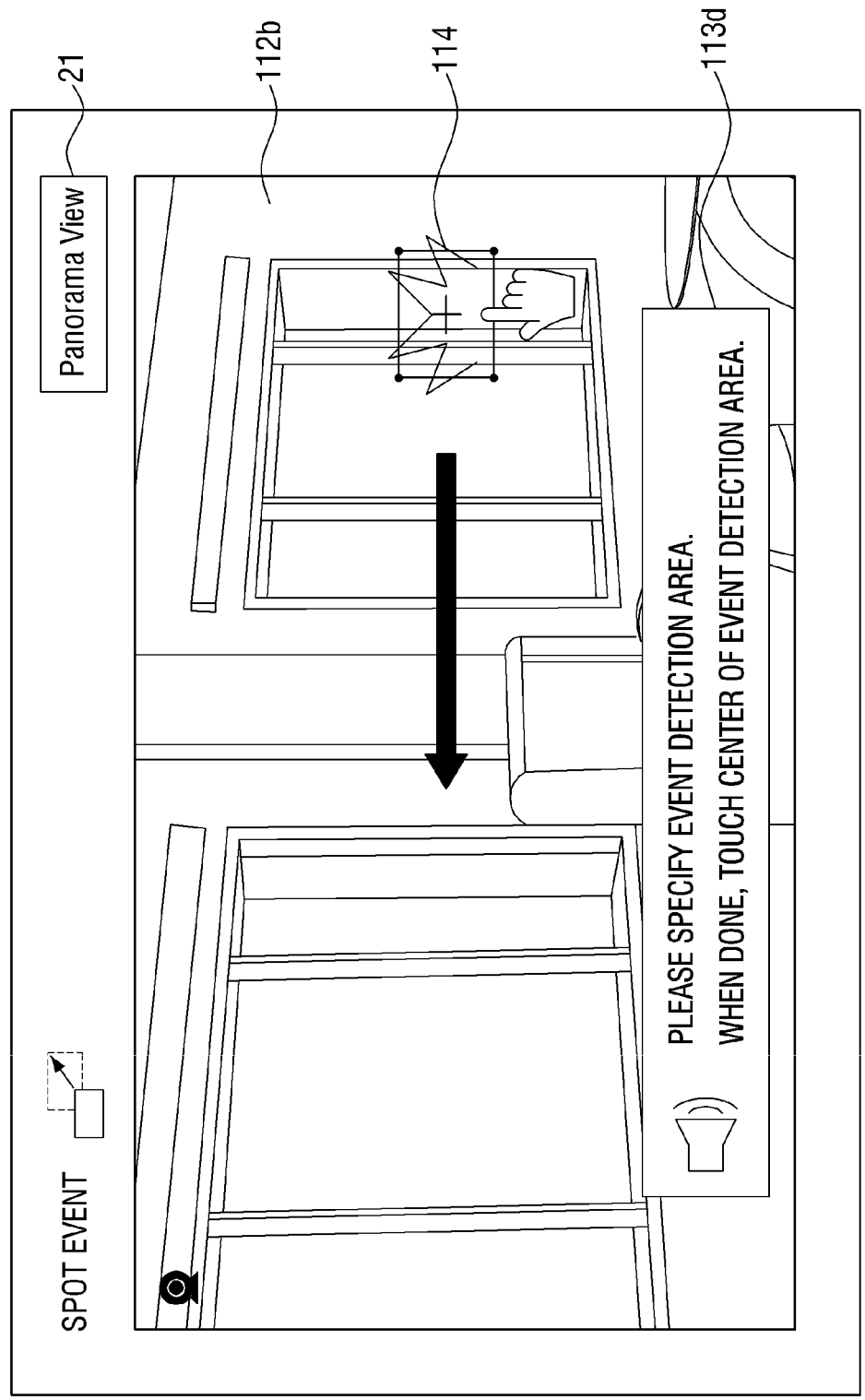
FIG. 10 illustrates an operation of dragging the window according to an exemplary embodiment of the present disclosure.
Figure 11:
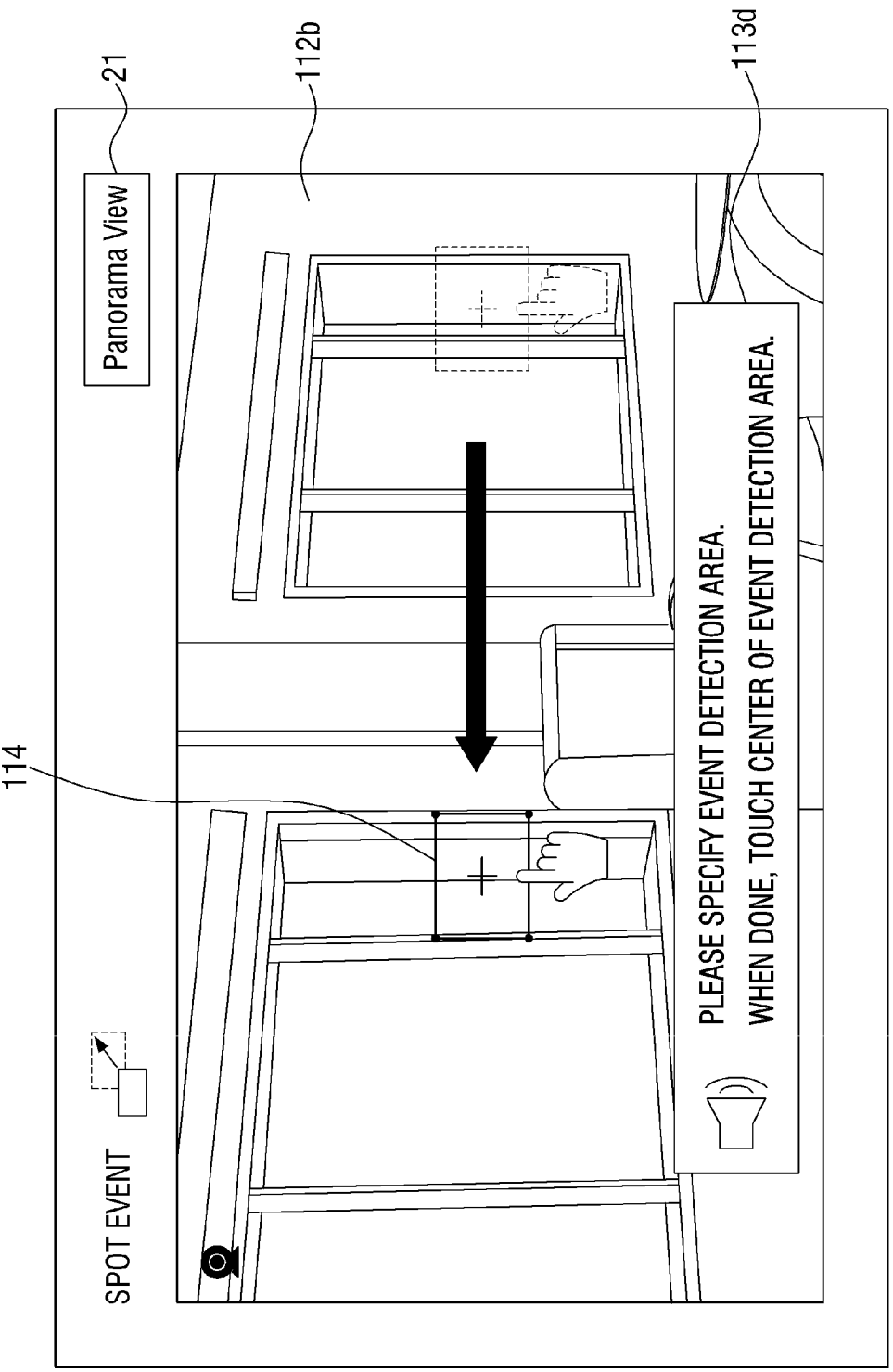
FIG. 11 illustrates the window moved as a result of the operation of FIG. 10.

FIG. 10 illustrates an operation of dragging the window 114 according to an exemplary embodiment of the present disclosure. FIG. 11 illustrates the window 114 moved as a result of the operation of FIG. 10.

In order to move the window 114 from one point to another point, the user touches the approximate center of the window 114 with a finger or the like as illustrated in FIG. 10. Then, the user holds the touch instead of releasing the touch immediately. Hold refers to an act of maintaining a touch for a predetermined period of time or longer after performing the touch and before performing a drag. The predetermined period of time may be, but is not limited to, about 0.5 seconds to 1 second. The user drags the window 114 from one point to another point while keeping the touch of the finger or the like. Then, the window 114 is moved from one point to another point by the drag of the finger, as illustrated in FIG. 11. After the window 114 is moved to a desired point, the touch is released. When the touch is released, the dragged window 114 is fixed at the point where the touch is released.

If the user can input a command to the monitoring device 1 using a mouse, he or she may move the window 114 from one point to another point by dragging the window 114 with the mouse.

Figure 12:
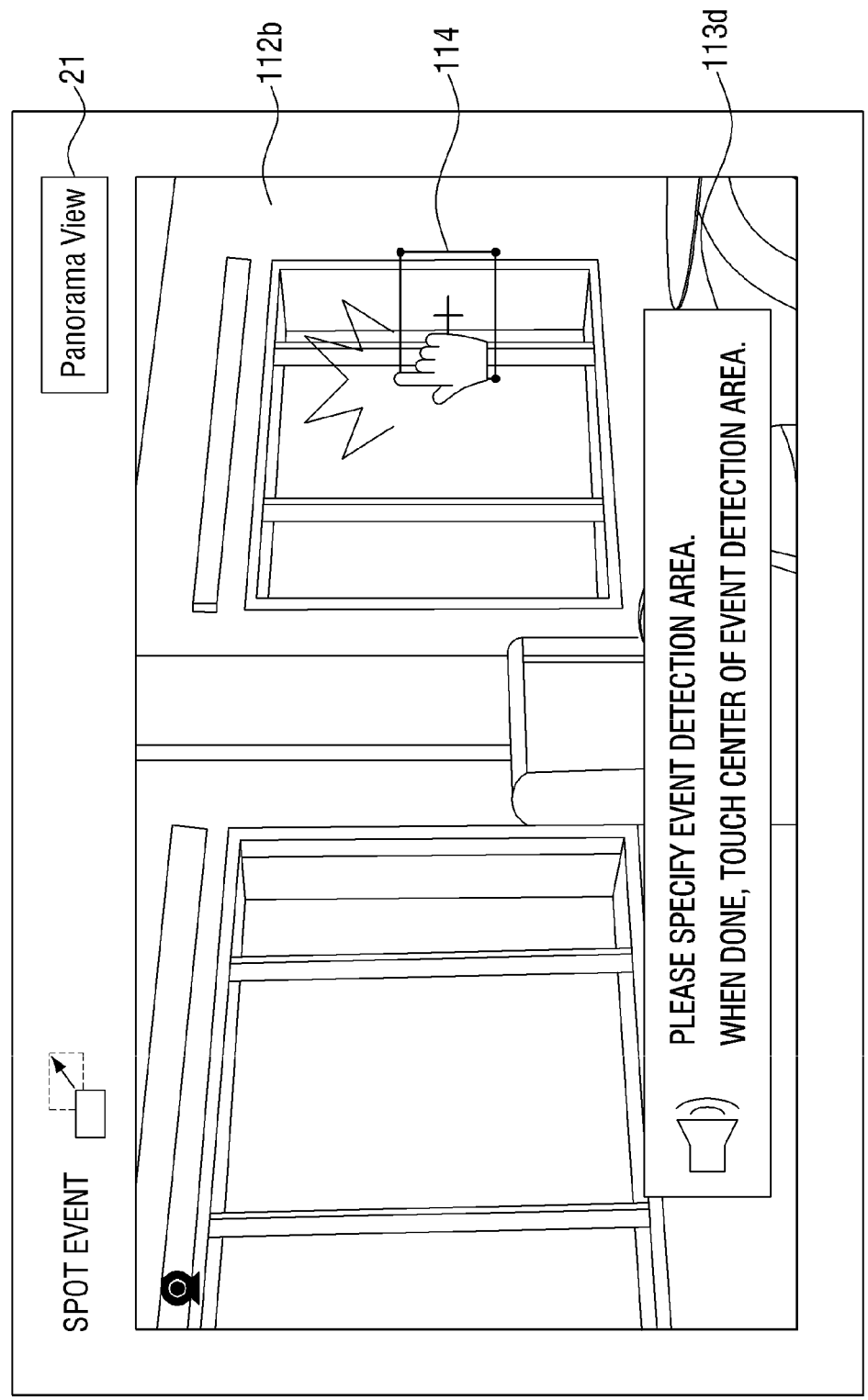
FIG. 12 illustrates an operation of dragging a vertex of the window according to an exemplary embodiment of the present disclosure.
Figure 13:
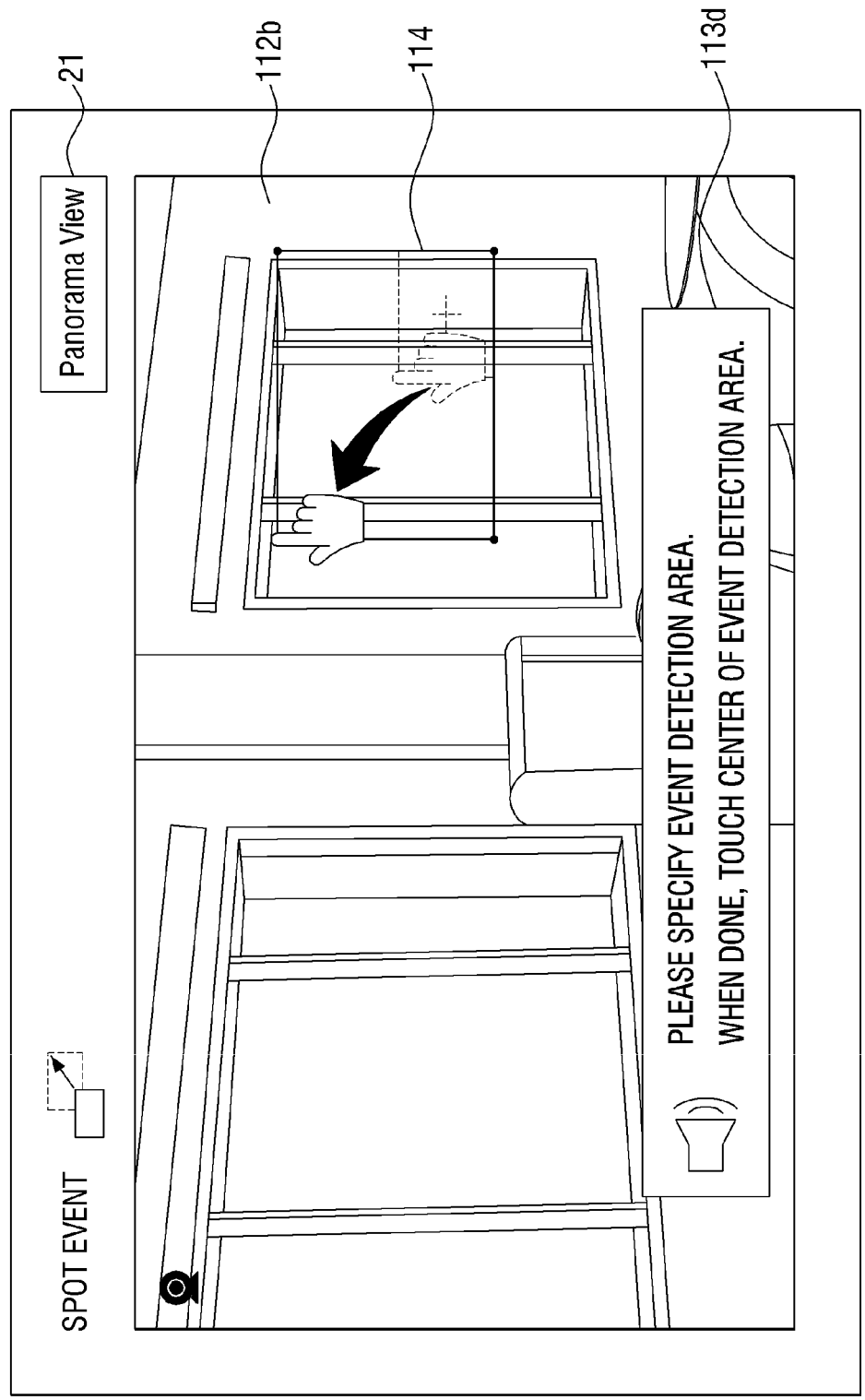
FIG. 13 illustrates the window enlarged as a result of the operation of FIG. 12.

FIG. 12 illustrates an operation of dragging a vertex of the window 114 according to an exemplary embodiment of the present disclosure. FIG. 13 illustrates the window 114 enlarged as a result of the operation of FIG. 12.

Figure 14:
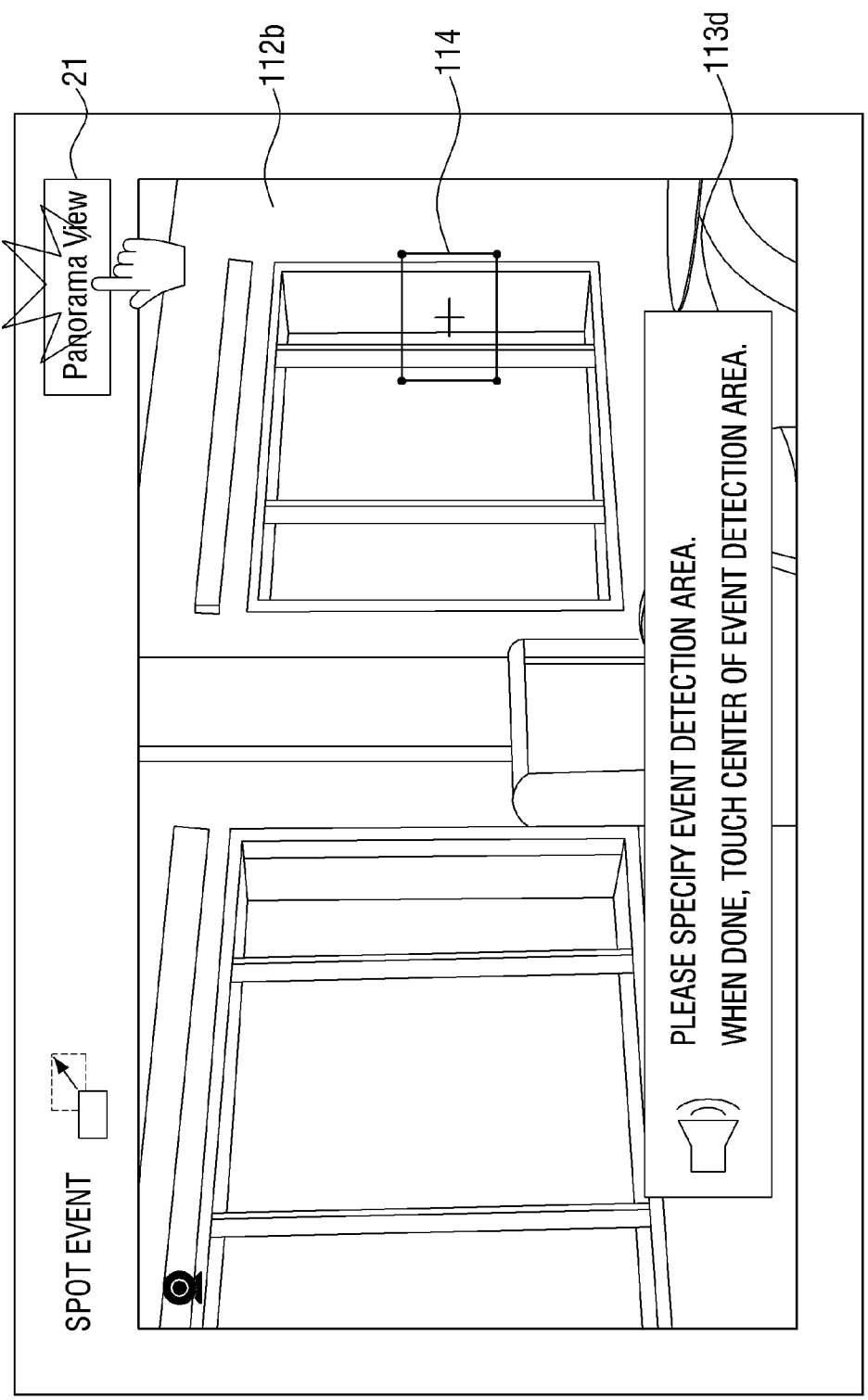
FIG. 14 illustrates an operation of tapping a panorama view button according to an exemplary embodiment of the present disclosure.

In order to enlarge the size of the window 114, the user touches a vertex of the window 114 or a boundary of the window 114 with a finger or the like and then holds the touch as illustrated in FIG. 12. The user drags the vertex or boundary of the window 114 while maintaining the touch of the finger. Then, the size of the window 114 is enlarged as illustrated in FIG. 14. After the window 114 is enlarged to a desired size, the touch is released. Although not illustrated in the drawings, the size of the window 114 can be reduced in the same manner as described above.

If the user can input a command to the monitoring device 1 using a mouse, he or she may place a mouse cursor on the vertex or boundary of the window 114 and drag the mouse cursor to enlarge or reduce the size of the window 114.

Although not illustrated in the drawings, the user may also perform a pinch in to enlarge the window 114. Here, pinch is one of the touch gestures and refers to sliding two fingers in opposite directions while maintaining the touch of the two fingers on the screen unit 11. In general, pinch is used to adjust the magnification of the screen displayed on the screen unit 11. If the two fingers are slid in directions approaching each other, it is called pinch in or pinch close. In this case, an image may be reduced. On the other hand, if the two fingers are slid in directions away from each other, it is called pinch out or pinch open. In this case, the image may be enlarged.

If the user touches an area inside the window 114 with two fingers and performs a pinch in, the size of the window 114 is reduced. On the other hand, if the user touches the area inside the window 114 with the two fingers and performs a pinch out, the size of the window 114 is enlarged.

Figure 15:
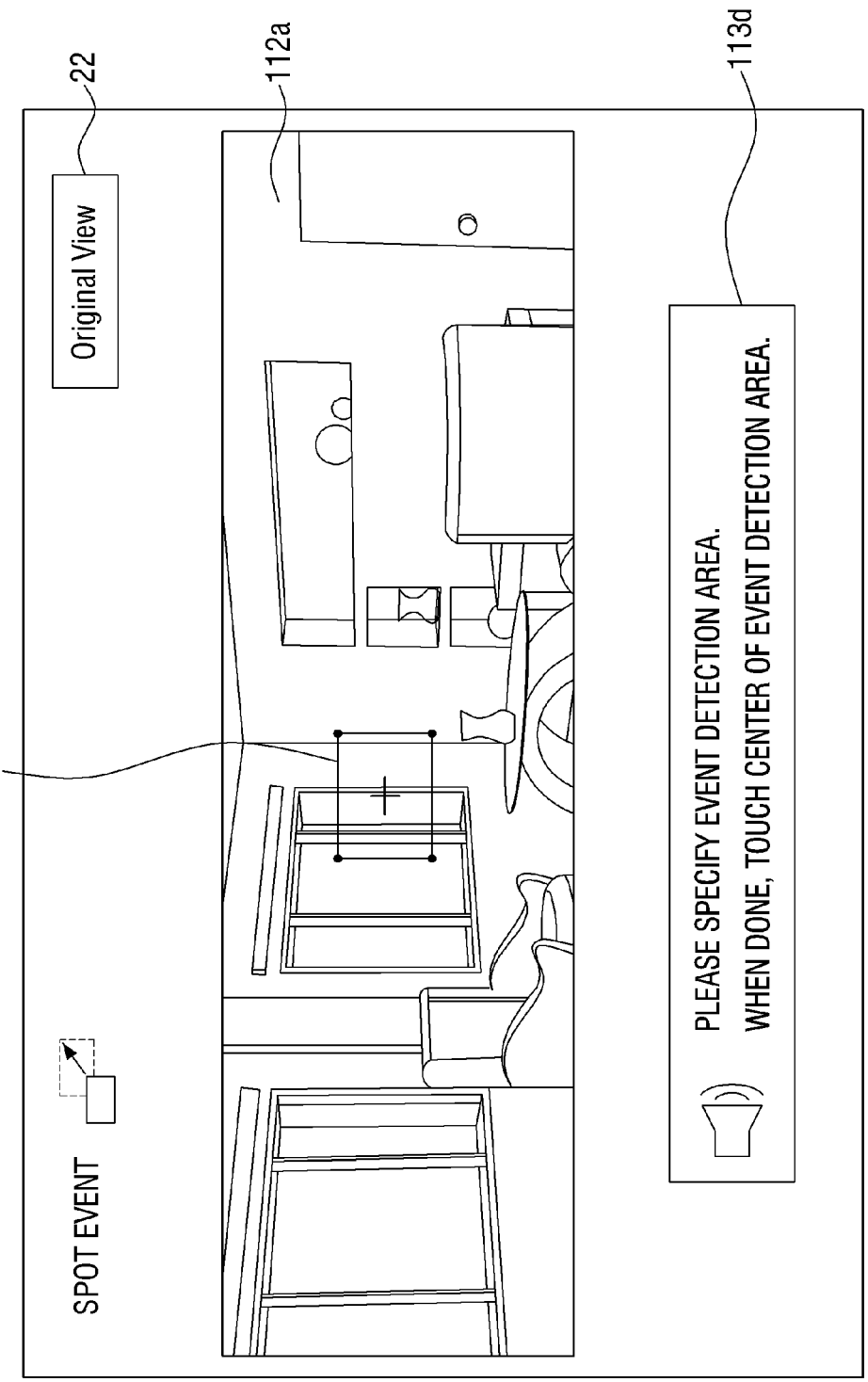
FIG. 15 illustrates a panorama view displayed on a screen unit as a result of the operation of FIG. 14.

FIG. 14 illustrates an operation of tapping a Panorama View button 21 according to an exemplary embodiment of the present disclosure. FIG. 15 illustrates a panorama view displayed on the screen unit 11 as a result of the operation of FIG. 14.

Currently, only the partial image 112b of the full-angle-of-view image is displayed on the screen unit 11. However, there is also a case where the user wants to monitor the whole of the full-angle-of-view image 112a. In this case, the user taps the Panorama View button 21 as illustrated in FIG. 14. Then, the partial image 112b of the full-angle-of-view image displayed on the screen unit 11 is converted into a panorama view which is the whole of the full-angle-of-view image 112a, and the panorama view is displayed as illustrated in FIG. 15.

Here, the Panorama View button 21 is a toggle button. That is, when the user taps the Panorama View button 21, the Panorama View button 21 is converted into an Original View button 22 as the panorama view of the full-angle-of-view image 112a is displayed on the screen unit 11. Although not illustrated in the drawings, if the user taps the Original View button 22, only the partial image 112b of the full-angle-of-view image is displayed on the screen unit 11, and the Original View button 22 is converted back to the Panorama View button 21. That is, whenever the toggle button is tapped, the panorama view and the original view are alternately displayed on the screen unit 11.

Figure 16:
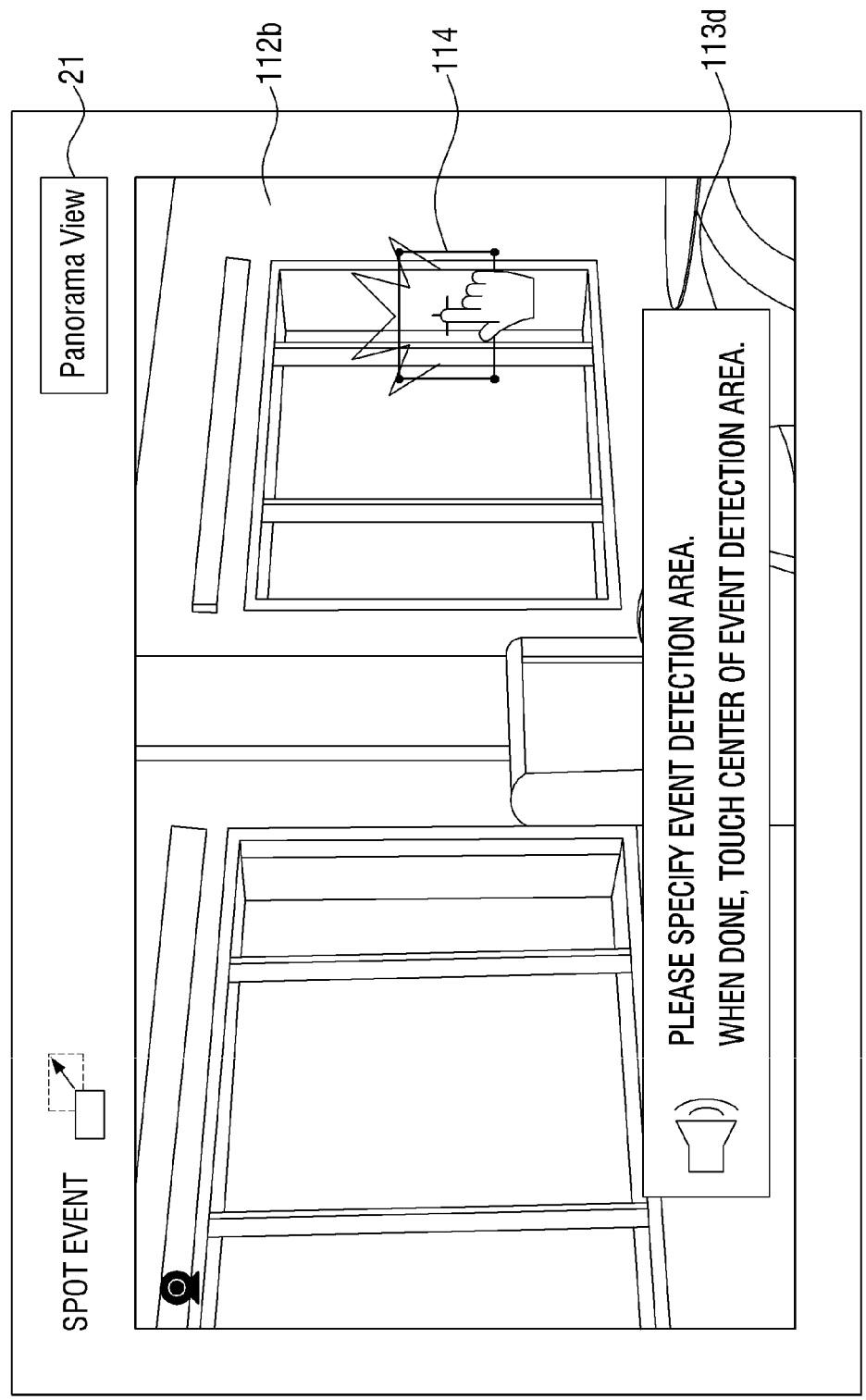
FIG. 16 illustrates an operation of tapping an area inside the window according to an exemplary embodiment of the present disclosure.
Figure 17:
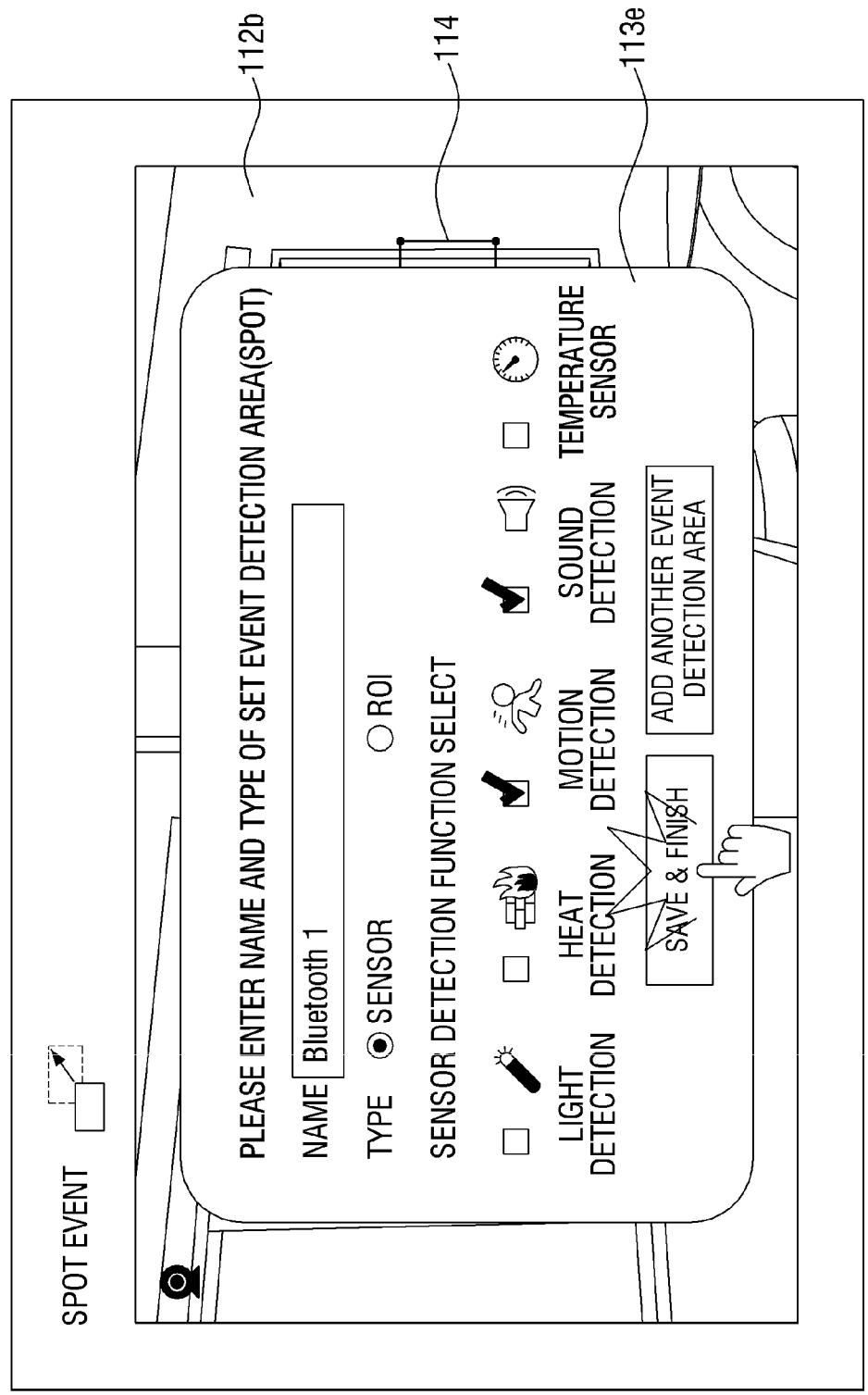
FIG. 17 illustrates a guide window for completing the setting of the event detection area, which is displayed as a result of the operation of FIG. 16.

FIG. 16 illustrates an operation of tapping the area inside the window 114 according to an exemplary embodiment of the present disclosure. FIG. 17 illustrates a guide window 113e for completing the setting of the event detection area 117, which is displayed as a result of the operation of FIG. 16.

After the user accurately specifies an area to be set as the event detection area 117 through the window 114, he or she taps the area inside the window 114 as illustrated in FIG. 14 in order to complete the setting of the event detection area 117. Then, the guide window 113e for entering the name and type of the event detection area 117 is displayed as illustrated in FIG. 17 to complete the setting of the event detection area 117.

The name and type of the event detection area 117 to be set may be entered into the guide window 113e as illustrated in FIG. 17. The type may be the sensor 3 or the ROI, and the user may select one of the two using a radio button. As described above, the user may select the sensor 3 if the sensor 3 is installed in the specific area and if the user wants to check an event through the sensor 3. Alternatively, the user may select the ROI if the sensor 3 is not installed or if the user wants to check the event through the ROI described above. That is, the user may set the event detection area 117 by selecting either the sensor 3 or the ROI as a method of checking an event.

After the type of the event detection area 117 is selected, specific sub-functions may be selected. For example, as illustrated in FIG. 17, if the user selects the sensor 3, specific detection functions of the sensor 3 may be selected. The types of the detection functions include light, heat, motion, sound, and temperature. However, the detection functions are not limited to these examples, and various functions can be selected as long as detection by the sensor 3 is possible. Here, if the type of the sensor 3 installed in advance is a motion sensor 3 that cannot detect sound, heat and light at all, only a motion detection function may be activated in the guide window 113e so that it can be selected by the user, and the other functions may be deactivated so that they cannot be selected by the user.

In FIG. 17, the user selected the sensor 3 as the type of the event detection area (spot) 117 and selected motion and sound as detection functions of the sensor 3. In addition, the user entered Bluetooth 1 as the name to indicate that the sensor 3 is a Bluetooth sensor using Bluetooth communication. If a 'Save & Finish' button is selected after the name and the type are all entered in this way, the setting of the event detection area 117 is completed. Here, if the user selects an 'Add another Event detection area' button, another event detection area 117 can be additionally set. In this case, the whole process is repeated again, starting with the process described with reference to FIG. 6.

FIG. 18 illustrates a state where the setting of event detection areas 117 has been completed according to an exemplary embodiment of the present disclosure.

If all event detection areas 117 are set, the main image 112 is displayed on the screen unit 11, and the set event detection areas 117 are marked on the main image 112 as illustrated in FIG. 18. Here, in FIG. 18, the user set three event detection areas 117. If the user selects the 'Add Event detection area' button in the guide window 113e illustrated in FIG. 17, another event detection area 117 can be additionally set. Therefore, a plurality of event detection areas 117 can be set as illustrated in FIG. 18.

As described above, an event detection area 117 is an area set by the user in the main image 112 at a location corresponding to a target monitoring area. The target monitoring area refers to an area desired by the user to be monitored particularly intensively in the specific area captured by the camera 2. Therefore, when an event occurs in the target monitoring area, the number of events that occurred in the target monitoring area is counted and displayed numerically in the event detection area 117. Thus, the user can easily check the number of events that occurred in the target monitoring area for a specific time through the event detection area 117 without any special operation.

For example, in FIG. 18, 27 is displayed in a first event detection area 117*a*, 7 is displayed in a second event detection area 117*b*, and 13 is displayed in a third event detection area 117*c*. Thus, it can be understood that 27 events occurred for a specific time in a first target monitoring area corresponding to the first event detection area 117*a*, that 7 events occurred for the specific time in a second target monitoring area corresponding to the second event detection area 117*b*, and that 13 events occurred in a third target monitoring area corresponding to the third event detection area 117*c*. Here, the number of events that occurred refers only to events detected through specific sub-functions that the user selected when setting an event detection area 117. Therefore, if the user selected motion and sound as the detection functions of the sensor 3, the number of events that occurred is counted only for motion and sound events and is not counted for heat or light events even if the heat or light events occur.

The event detection areas 117 may be formed to be opaque as illustrated in FIG. 18, but may also be formed to be transparent so as to remove blind event detection areas of the image.

Figure 19:
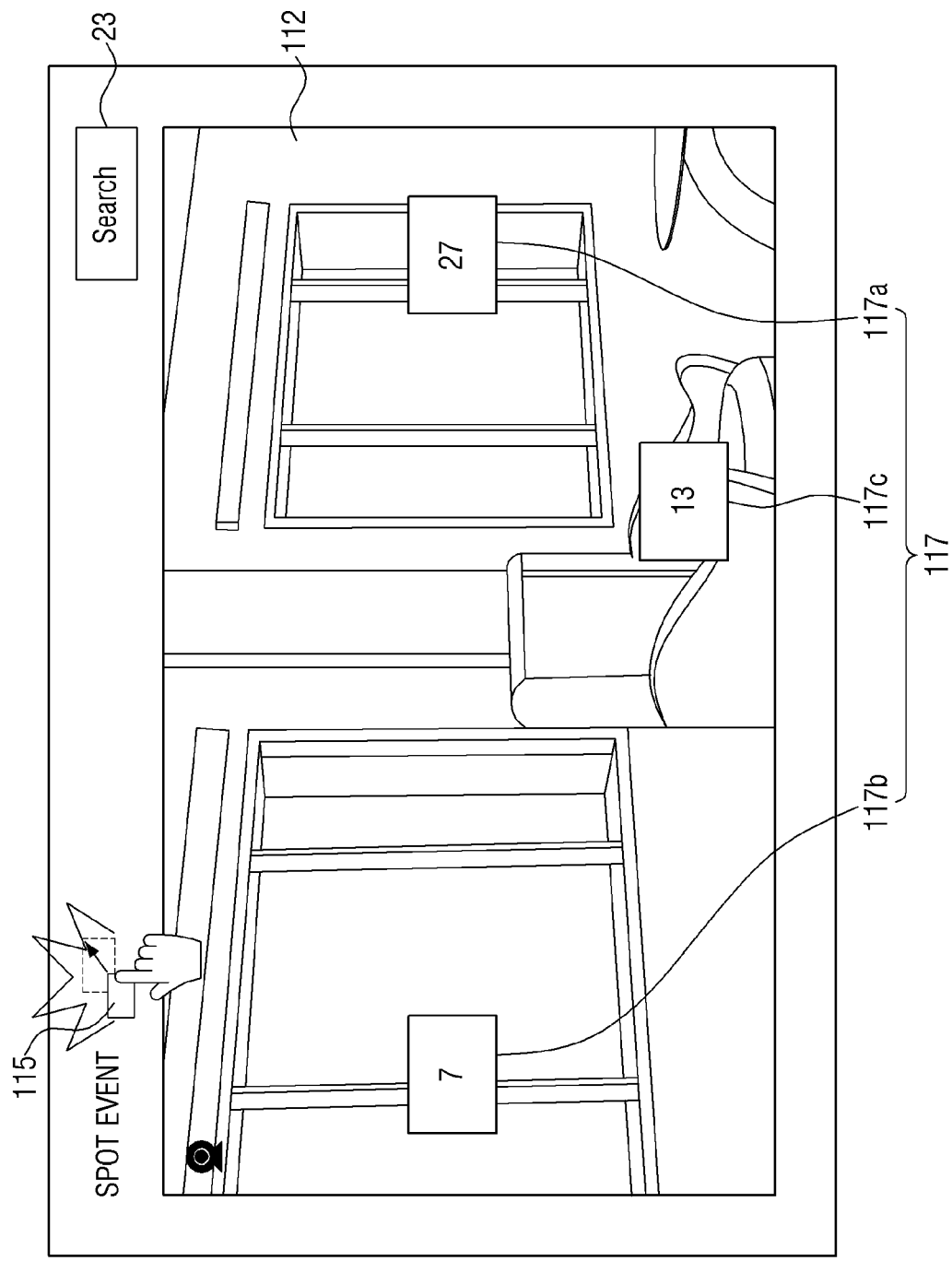
FIG. 19 illustrates an operation of tapping a list icon according to an exemplary embodiment of the present disclosure.
Figure 20:
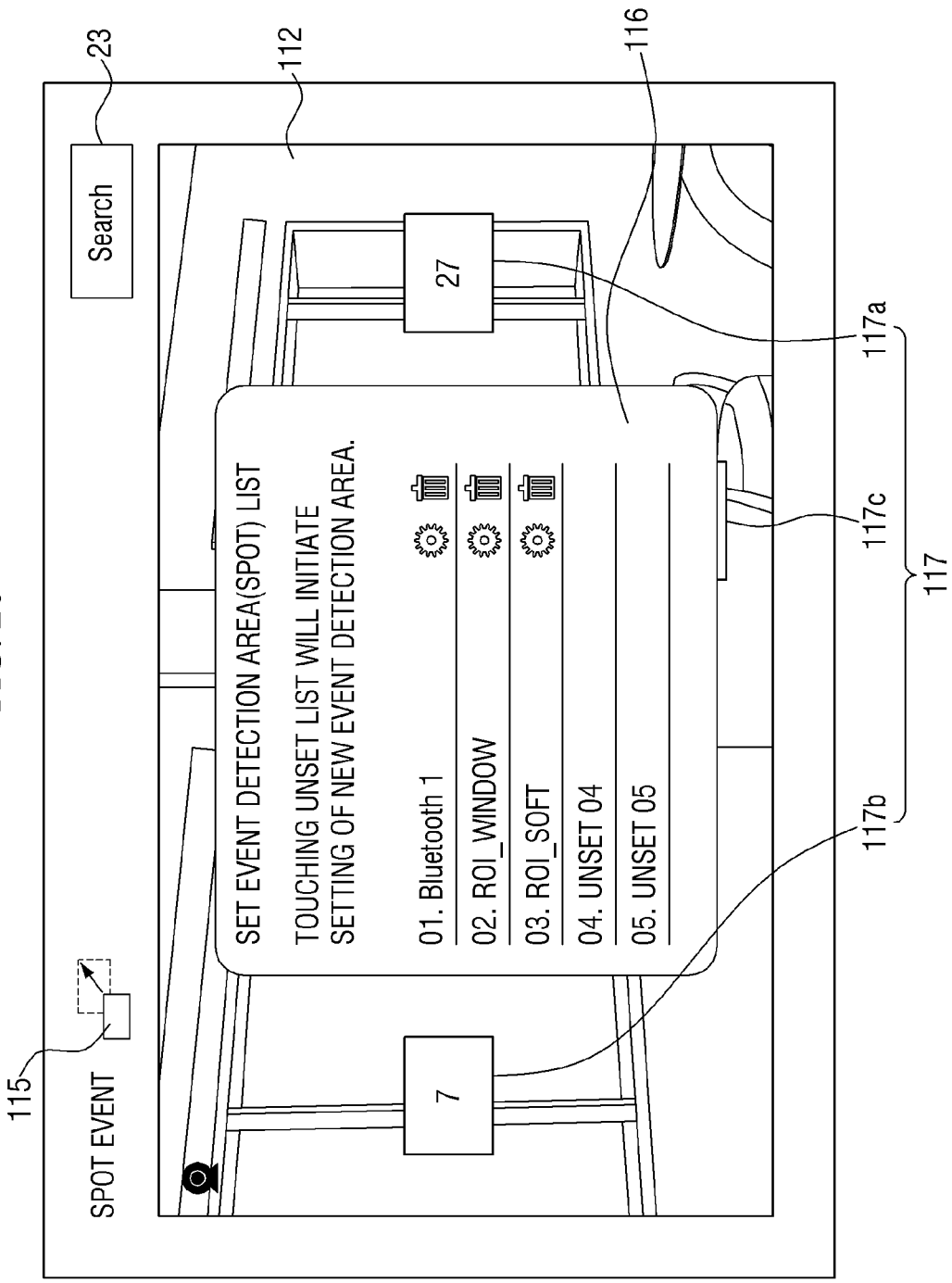
FIG. 20 illustrates a list of set event detection areas displayed on the screen unit as a result of the operation of FIG. 19.

FIG. 19 illustrates an operation of tapping a list icon 115 according to an exemplary embodiment of the present disclosure. FIG. 20 illustrates a list 116 of set event detection areas 117 displayed on the screen unit 11 as a result of the operation of FIG. 19.

The user may want to check or modify the contents of currently set event detection areas 117. In this case, if the user taps the list icon 115 according to an exemplary embodiment of the present disclosure as illustrated in FIG. 19, the list 116 of the currently set event detection areas 117 is displayed as illustrated in FIG. 20.

For example, referring to FIG. 20, the total number of the currently set event detection areas 117 is three. The name of the first event detection area 117*a* is 'Bluetooth 1,' the name of the second event detection area 117*b* is 'ROI_window,' and the name of the third event detection area 117*c* is 'ROI_sofa.' Such names may be arbitrarily entered by the user as described above.

A setting change icon and a delete icon are displayed on the right side of the same row as the name of each event detection area 117 on the list 116. When the user taps the setting change icon, the setting of a corresponding event detection area 117 may be changed. For example, the type of event detection may be changed to the sensor 3 or the ROI, and specific sub-functions such as light, heat, motion, sound and temperature may be changed. In addition, the name of the event detection area 117 already entered may be changed.

If an event detection area 117 is not needed any more, the user may delete the event detection area 117 by tapping the delete icon. If an event detection area 117 should be additionally set, the user may add the event detection area 117 by tapping an unset list 116. In this case, the process described with reference to FIGS. 6 through 17 is repeated again.

Figure 21:
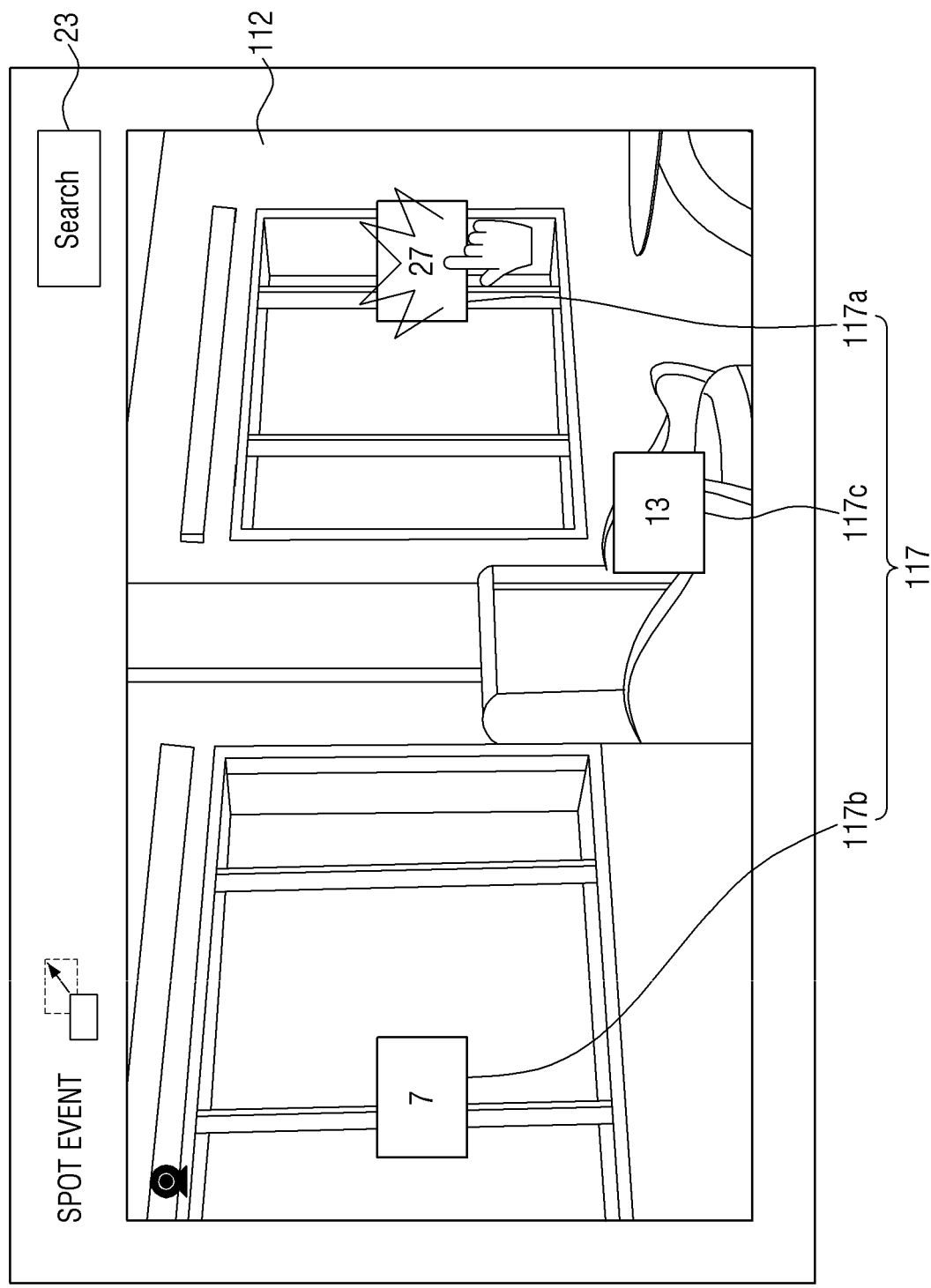
FIG. 21 illustrates an operation of tapping a first event detection area according to an exemplary embodiment of the present disclosure.
Figure 22:
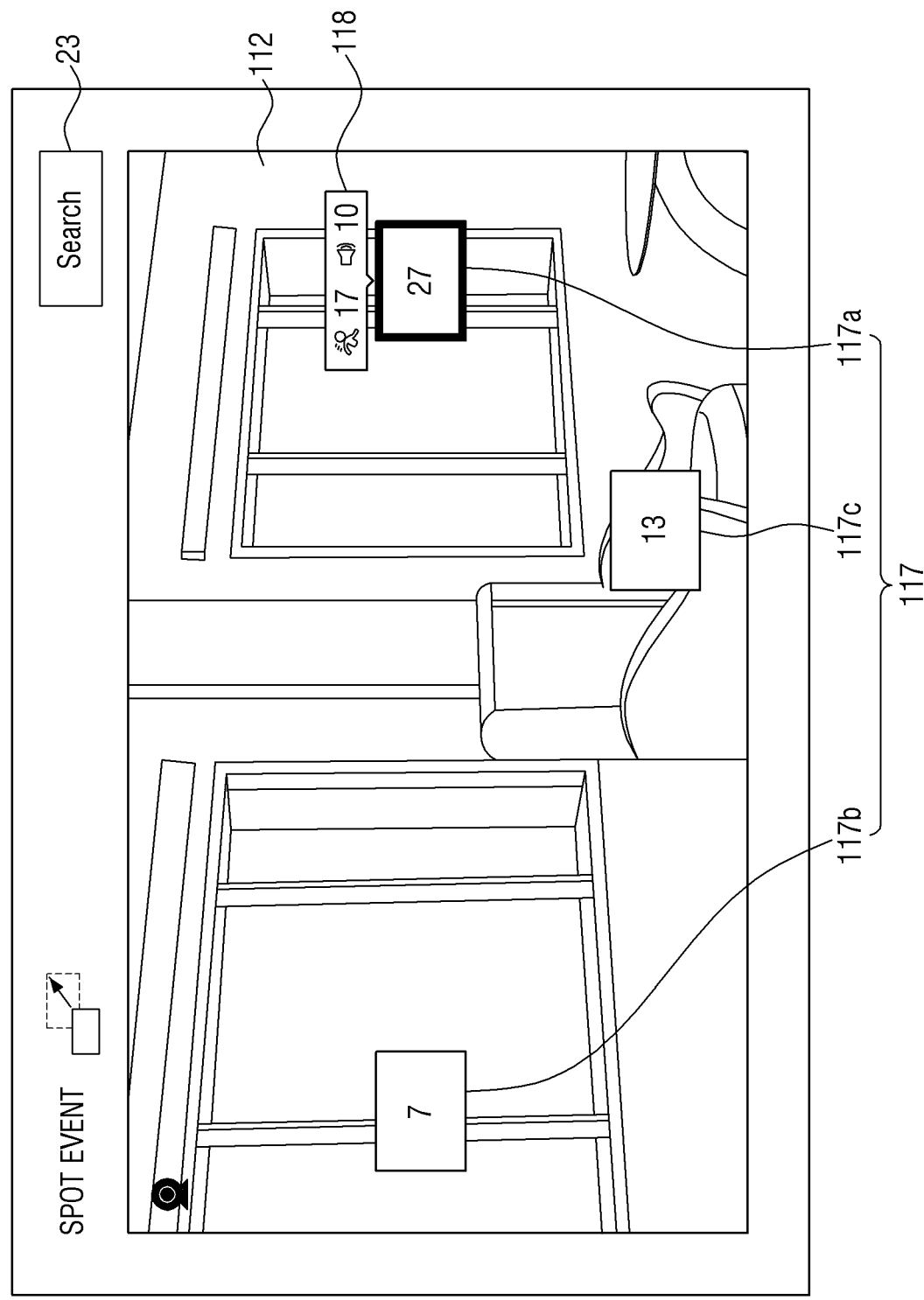
FIG. 22 illustrates an event detail display area displayed above the first event detection area as a result of the operation of FIG. 21.

FIG. 21 illustrates an operation of tapping the first event detection area 117*a* according to an exemplary embodiment of the present disclosure. FIG. 22 illustrates an event detail display area 118 displayed above the first event detection area 117*a* as a result of the operation of FIG. 21.

In the monitoring device 1 according to the exemplary embodiment of the present disclosure, the number of events that occurred in a target monitoring area is numerically displayed in an event detection area 117 corresponding to the target monitoring area. Therefore, the user can intuitively identify the number of events that occurred in the target monitoring area for a specific time. However, there is a case where the user wants to check details of events that occurred in the target monitoring area. In this case, the user selects the event detection area 117 corresponding to the target monitoring area through the monitoring device 1. For example, when the user wants to check details of events that occurred in the first target monitoring area, the user taps the first event detection area 117*a* as illustrated in FIG. 21. Then, the event detail display area 118 is displayed above the first event detection area 117*a* as illustrated in FIG. 22. The event detail display area 118 is an area numerically displaying the number of events that occurred by type of event. For example, referring to FIG. 22, motion detection is shown as 17 and sound detection is shown as 10 in the event detail display area 118 displayed above the first event detection area 117*a*. This indicates that 17 motion events were detected in the first target monitoring area for a specific time, and 10 sound events were detected in the first target monitoring area for the specific time. Since only the motion detection and the sound detection were selected as the specific sub-functions for the first event detection area 117*a* as described above, other detection functions are not provided. In addition, since the motion detection is 17 times and the sound detection is 10 times, if the two numbers are added together, the number 27 is obtained as displayed in the first event detection area 117*a*. That is, it can be understood that adding all the numbers displayed in the event detail display area 118 produces the number displayed at a corresponding event detection area 117.

Figure 23:
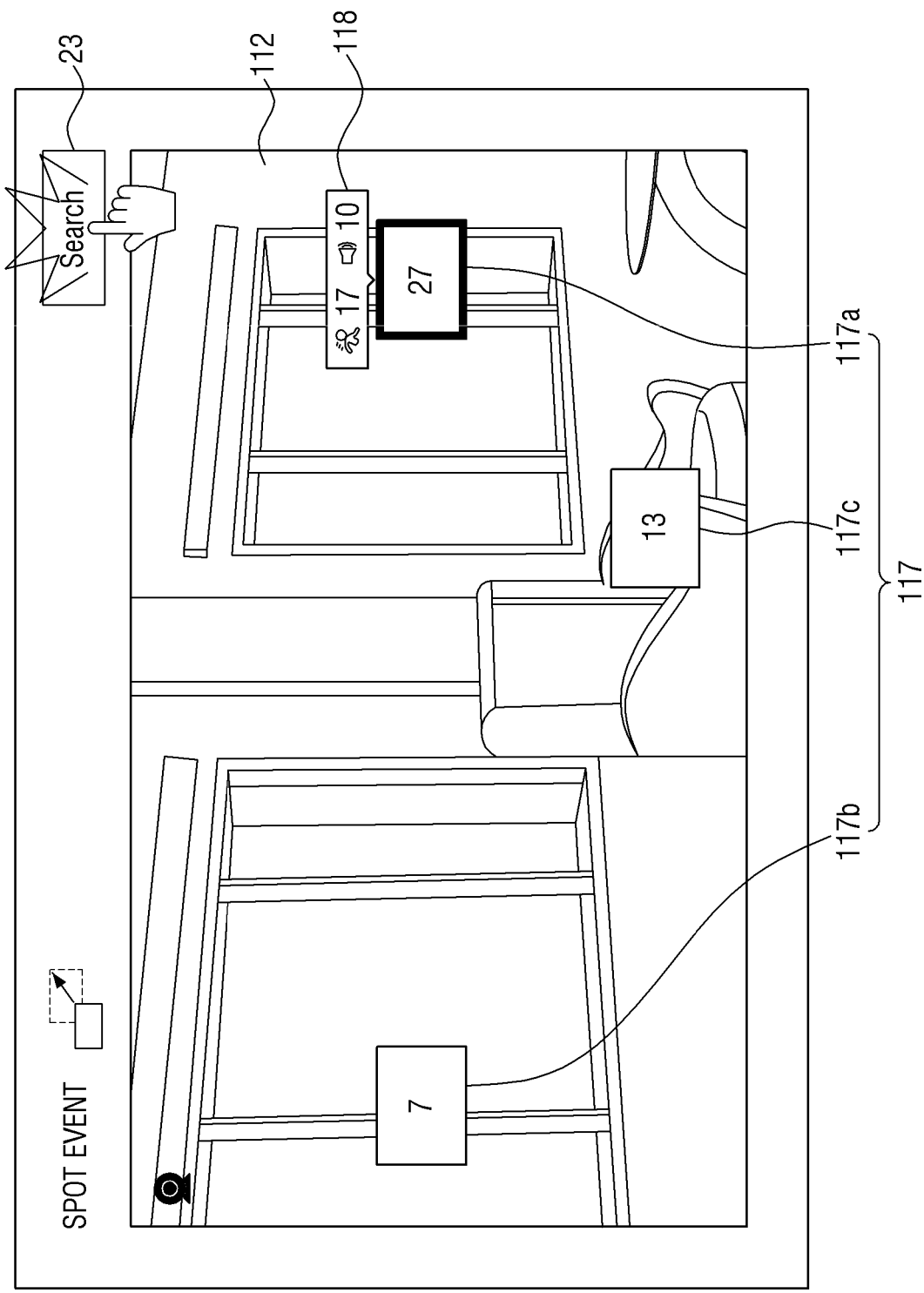
FIG. 23 illustrates an operation of tapping a Search button according to an exemplary embodiment of the present disclosure.
Figure 24:
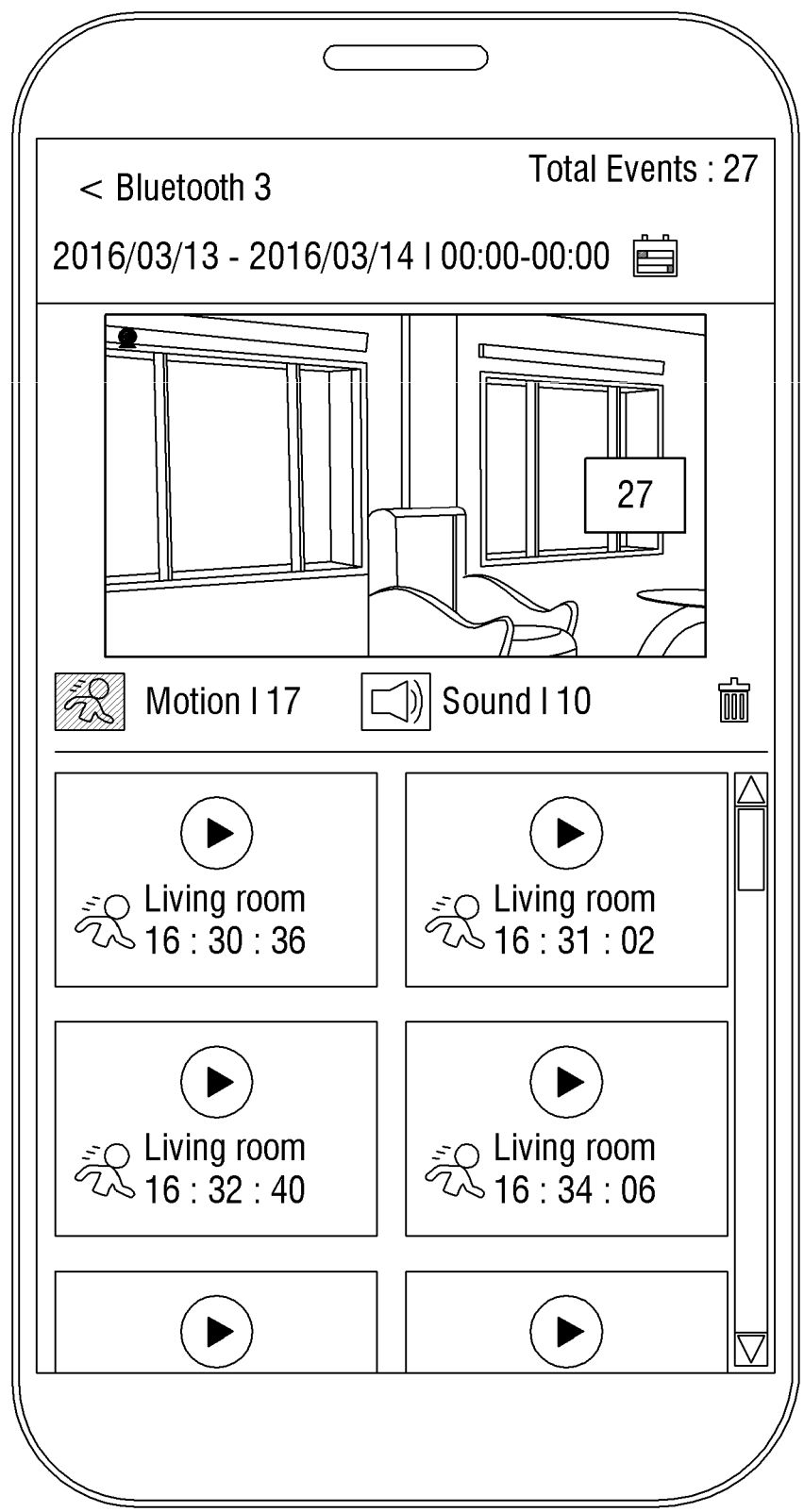
FIG. 24 illustrates search results obtained as a result of operation of FIG. 23.

FIG. 23 illustrates an operation of tapping a Search button 23 according to an exemplary embodiment of the present disclosure. FIG. 24 illustrates search results obtained as a result of the operation of FIG. 23.

As described above, when the user taps the first event detection area 117*a*, the event detail display area 118 is displayed. If the user wants to check events one by one, he or she taps the Search button 23 as illustrated in FIG. 23. Then, events detected at the first event detection area 117*a* are retrieved and displayed as illustrated in FIG. 24. If the camera 2 captured an area only when an event occurred and ended the capturing immediately after the event ended, the contents of only one event would be contained in one video. In this case, the number of videos retrieved is 27. The user can check the events that occurred by playing back each of the videos.

The search results include the number of events that occurred, the type of event that occurred, and the period and time during which the number of events was counted. For example, referring to FIG. 24, a total of 27 events including 17 motion events and 10 sound events were detected at the first event detection area 117*a*. If the user wants to check only the motion events and thus selects only the motion events, the number of videos retrieved is 17. The period during which the number of events was counted is from 0:00 on Mar. 13, 2016 to 0:00 on Mar. 14, 2016. If the user wants to search for another time period, he or she can input a desired time period by selecting a calendar icon displayed on the right side of the same row as date and time.

Some of the advantages that may be achieved by exemplary implementations of the invention include searching for events that occurred only in an area desired by a user to be monitored particularly intensively. In addition, it is possible to search for events of a type desired by the user. Furthermore, the user can easily check the number of events that occurred for a specific time without any special operation.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A monitoring device comprising:
a communicator configured to receive an image from a camera;
a screen configured to display the image; and
a processor configured to control operation of the communicator and the screen,
wherein the screen is configured to mark a plurality of event detection areas on the image,
wherein, in response to an event occurring in the plurality of event detection areas, the processor is configured to count a number of events that occurred,
wherein the plurality of event detection areas comprise different parts of the image to be monitored and are separated from each other in the image, and
wherein the screen is configured to numerically display the counted number of events in each of the plurality of event detection areas.

2. The monitoring device of claim 1, wherein, in response to the plurality of event detection areas being selected, the processor is configured to count the number of events separately for each type of event occurred in the selected event detection area, and the screen is further configured to display an event detail display area numerically displaying the counted number for each type of event.

3. The monitoring device of claim 1, wherein, in response to the plurality of event detection areas being selected, the processor is configured to search for the events by type.

4. The monitoring device of claim 1, wherein the screen is further configured to display a list icon and, in response to the list icon being selected, configured to display a list of names of event detection areas.

5. The monitoring device of claim 4, wherein the screen is configured to display a setting change icon and a delete icon around the name of each event detection area on the list,
wherein setting of a corresponding event detection area is changed in response to the setting change icon being selected, and
wherein a corresponding event detection area is deleted in response to the delete icon being selected.

6. The monitoring device of claim 1, further comprising an input unit,
wherein the communicator is further configured to communicate with an external sensor for detecting each event, and
wherein the screen is configured to display a window for selecting at least one of event detection using the external sensor and event detection using the image, in response to receiving a first user input for setting the plurality of event detection areas through the input unit.

7. The monitoring device of claim 6, wherein, in response to a second user input for selecting the event detection using the external sensor being received through the input unit, the processor is configured to set the plurality of event detection areas to detect the occurrence of each event through an event signal from the external sensor.

8. The monitoring device of claim 6, wherein, in response to a third user input for selecting the event detection using the image being received through the input unit, the processor is configured to set the plurality of event detection areas to detect the occurrence of each event through a region of interest (ROI) specified in the image.

9. The monitoring device of claim 1, wherein the camera comprises a pan-tilt camera, and a full-angle-of-view image of the camera is captured before setting the plurality of event detection areas.

10. The monitoring device of claim 1, wherein, in response to the plurality of event detection areas not being set, the screen is configured to display a window that is adjusted to accurately set the plurality of event detection areas.

11. A monitoring system comprising:
a camera configured to capture an image;
at least one sensor configured to generate an event signal in response to detecting at least one of various types of events; and
a monitoring device configured to communicate with the camera and the at least one sensor, the monitoring device comprising:
a communicator configured to receive the image from the camera and the event signal from the at least one sensor;
a screen configured to display the image; and
a processor configured to control operation of the communicator and the screen,
wherein the monitoring device is configured to mark a plurality of target monitoring areas on the image,
wherein the processor is configured to detect an event related to the plurality of target monitoring areas based on the event signal, and count a number of events that occurred in the plurality of target monitoring areas,
wherein the plurality of target monitoring areas comprise different parts of the image to be monitored and are separated from each other in the image, and
wherein the screen is configured to numerically display the counted number of events in each of the plurality of target monitoring areas.

12. The monitoring system of claim 11, wherein, in response to the plurality of target monitoring areas being selected, the processor is configured to count the number of events separately for each type of event occurred in the plurality of target monitoring areas, and the screen is further configured to display an event detail display area numerically displaying the counted number for each type of event.

13. The monitoring system of claim 11, wherein, in response to the plurality of target monitoring areas being selected, the processor is configured to search for events related to the plurality of target monitoring areas.

14. The monitoring system of claim 13, wherein the processor is configured to search for the events related to the plurality of target monitoring areas by type of the event.

15. The monitoring system of claim 11, wherein the screen is further configured to display a list icon and, in response to the list icon being selected, configured to display a list of names of target monitoring areas.

16. A monitoring system comprising:
a camera configured to capture an image; and
a monitoring device configured to communicate with the camera, the monitoring device comprising:
a communicator configured to receive the image from the camera;
a screen configured to display the image; and a processor configured to control operation of the communicator and the screen, wherein the processor is configured to detect the occurrence of an event in a plurality of regions of interest (ROIs) in response to the plurality of ROIs being defined in the image, wherein the screen is configured to mark the plurality of ROIs on the image, wherein, in response to the occurrence of each event being detected in the plurality of ROIs, the processor is configured to count a number of events that occurred, wherein the plurality of ROIs comprise different parts of the image to be monitored and are separated from each other in the image, and wherein the screen is configured to numerically display the counted number of events in each of the plurality of ROIs.

17. The monitoring system of claim 16, wherein, in response to the ROI being selected, the processor is configured to count the number of events separately for each type of event occurred in the selected ROI, and the screen is further configured to display an event detail display area numerically displaying the counted number for each type of event.

18. The monitoring system of claim 16, wherein, in response to the ROI being selected, the processor is configured to search for events occurred in the ROI.

19. The monitoring system of claim 18, wherein the processor is configured to search for the events by type.

20. The monitoring system of claim 16, wherein the screen is further configured to display a list icon and, in response to the list icon being selected, configured to display a list of names of event detection areas.

* * * * *